United States Patent
Thatte et al.

(10) Patent No.: US 10,621,584 B2
(45) Date of Patent: Apr. 14, 2020

(54) NETWORK OF BIOMETRICALLY SECURE DEVICES WITH ENHANCED PRIVACY PROTECTION

(71) Applicant: Clover Network, Inc., Sunnyvale, CA (US)

(72) Inventors: Sameer Jayant Thatte, Campbell, CA (US); Arvin Carl Robert Haywood, Mountain View, CA (US); Brian Jeremiah Murray, Mountain View, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 15/828,962

(22) Filed: Dec. 1, 2017

(65) Prior Publication Data

US 2018/0108020 A1    Apr. 19, 2018

Related U.S. Application Data

(63) Continuation-in-part of application No. 15/480,288, filed on Apr. 5, 2017, now abandoned, which is a
(Continued)

(51) Int. Cl.
*G06Q 20/00* (2012.01)
*G06Q 20/40* (2012.01)
(Continued)

(52) U.S. Cl.
CPC ....... *G06Q 20/40145* (2013.01); *G06Q 20/20* (2013.01); *G06Q 20/202* (2013.01);
(Continued)

(58) Field of Classification Search
CPC .......... G06Q 20/40145; G06Q 20/20
(Continued)

(56) References Cited

U.S. PATENT DOCUMENTS 4,736,203 A    4/1988 Sidlauskas
5,615,277 A    3/1997 Hoffman
(Continued)

FOREIGN PATENT DOCUMENTS

WO    2001043338 A1    6/2001
WO    2009082199 A1    7/2009

OTHER PUBLICATIONS

C. Soutar, et al., Biometric Encryption, ICSA Guide to Cryptography, Chapter 22, McGraw-Hill, 1999.
(Continued)

*Primary Examiner* — Patrick McAtee
*Assistant Examiner* — John Winter
(74) *Attorney, Agent, or Firm* — Daylight Law, P.C.

(57) ABSTRACT

This disclosure includes biometrically secured networked devices with enhanced privacy protection. One system includes a first biometrically secured device having a first sensor, and a second biometrically secured device having a second sensor. The first device is programmed to: (i) obtain a first sample of a first biometric using the first sensor; (ii) generate a secret biometrically derived key using the first sample of the first biometric; (iii) encrypt a set of biometric data using the secret biometrically derived key; and (iv) transmit the set of encrypted biometric data to the second biometrically secured device. The second device is programmed to: (i) obtain a second sample of the first biometric using the second sensor; (ii) generate the secret biometrically derived key using the second sample of the first biometric; and (iii) decrypt the set of biometric data using the secret biometrically derived key.

30 Claims, 13 Drawing Sheets

Related U.S. Application Data continuation of application No. 15/072,252, filed on Mar. 16, 2016, now Pat. No. 9,619,804.

(51) Int. Cl.
 *G06Q 20/20* (2012.01)
 *H04L 9/30* (2006.01)
 *G06Q 20/38* (2012.01)
 *H04L 9/08* (2006.01)
 *H04L 9/32* (2006.01)

(52) U.S. Cl.
 CPC ....... *G06Q 20/206* (2013.01); *G06Q 20/3821* (2013.01); *H04L 9/0825* (2013.01); *H04L 9/0866* (2013.01); *H04L 9/30* (2013.01); *H04L 9/3231* (2013.01); *H04L 2209/805* (2013.01)

(58) Field of Classification Search
 USPC .............................. 713/171; 705/50; 235/382
 See application file for complete search history.

(56) References Cited

U.S. PATENT DOCUMENTS

| | | | |
|---|---|---|---|
| 6,694,025 B1* | 2/2004 | Epstein | .................. H04L 9/083 380/277 |
| 8,646,060 B1 | 2/2014 | Ayed | |
| 2003/0150911 A1* | 8/2003 | Joseph | .................. G06K 17/00 235/382 |
| 2004/0122752 A1 | 6/2004 | Horne et al. | |
| 2005/0109836 A1 | 5/2005 | Ben-Aissa | |
| 2008/0282334 A1 | 11/2008 | Yves et al. | |
| 2008/0319906 A1 | 12/2008 | Russell et al. | |
| 2009/0037746 A1 | 2/2009 | Abdallah et al. | |
| 2009/0150671 A1* | 6/2009 | Abe | .................... H04L 63/0823 713/169 |
| 2009/0153302 A1 | 6/2009 | Barnes et al. | |
| 2010/0017618 A1 | 1/2010 | Golic | |
| 2014/0040145 A1 | 2/2014 | Ozvat et al. | |
| 2014/0108173 A1 | 4/2014 | Cooper et al. | |
| 2014/0214670 A1 | 7/2014 | McKenna | |
| 2014/0344583 A1 | 11/2014 | Abdallah et al. | |
| 2015/0381621 A1 | 12/2015 | Innes et al. | |
| 2016/0205080 A1 | 7/2016 | Abdallah | |

OTHER PUBLICATIONS

Granbury Solutions, FireFly Knowledge Base, Register a Finger Print, Available at: https://fireflypos.uservoice.com/knowledgebase/articles/596487-register-a-finger-print (Accessed on Mar. 11, 2016).

Granbury Solutions, FireFly Point-of-Sale Home Page, Available at: http://www.granburyrs.com/solutions/firefly-point-of-sale (Accessed on Mar. 11, 2016).

Lee, McDonald's Testing Biometrics Technology on POS System, Biometric Update, Dec. 2, 2015. Available at: ww.biometricupdate.com/201512/mcdonalds-testing-biometrics-technology-on-pos-system (Accessed on Mar. 11, 2016).

Non-Final Office Action dated Jul. 13, 2017 for U.S. Appl. No. 15/480,288.

Notice of Allowance dated Feb. 7, 2017 for U.S. Appl. No. 15/072,252.

Office Action dated Aug. 12, 2016 for U.S. Appl. No. 15/072,252.

Wikipedia, Forward Error Correction, Available at: https://en.wikipedia.org/wiki/Forward_error_correction, Accessed on: Nov. 20, 2017.

\* cited by examiner

200 ately applicable to a single user, or provide a
NETWORK OF BIOMETRICALLY SECURE DEVICES WITH ENHANCED PRIVACY PROTECTION This application is a continuation-in-part of U.S. patent application Ser. No. 15/480,288, filed on Apr. 5, 2017, which is a continuation of U.S. patent application Ser. No. 15/072,252, filed on Mar. 16, 2016, now U.S. Pat. No. 9,619,804, both of which are incorporated by reference in their entirety herein for all purposes.

BACKGROUND OF THE INVENTION

Identity verification is an important feature of modern computerized devices. Computerized devices provide portals to sensitive control systems, financial information, and personal information that should only be accessible to a certain individual or set of people. Aside from security, identity verification can provide a degree of convenience for tracking use of the device or customizing the device for a user. In the case of a multiuser device, the device can use identity verification information to provide data or interfaces that are specifically applicable to a single user, or provide a more accurate record of which user conducted which actions using the device. For example, a point of sale (POS) device can keep track of which employee used the device to conduct a specific transaction. Furthermore, some multiuser devices are designed specifically for identification purposes such as time card systems that track when an employee clocked in for work, or electronically controlled access points that determine whether a user is authorized to pass through a physical barrier.

Traditional approaches for identity verification include verification operations conducted using various kinds of information that are colloquially referred to as: who you are, what you know, and what you have. Biometric (who you are) information is replacing passwords (what you know) information in an increasing number of applications due to its universality, permanence, and convenience. However, the permanence of biometric information has caused this increase in usage to be accompanied by increased privacy concerns. If a favorite password is compromised by an identity thief, a user can very easily switch to a different arbitrary string of characters. However, if biometric data is compromised, the situation is much more serious. Aside from its permanence, the simple fact that biometric information is a part of one's person makes it feel more personal. People that are not usually concerned with permanent personal information like their mother's maiden name being stored and used to identify them will sometimes balk at providing a fingerprint or iris scan to a third party. Furthermore, the use of biometric information often requires a time-consuming registration process that involves training the device with multiple samples of whatever biometric data is being used. For example, the training procedures can involve multiple scans of a single fingerprint or multiple prompts for a vocal sample.

SUMMARY OF INVENTION

FIG. 1 illustrates a system 100 in which multiple users 101, 102, and 103 are registered to use various devices 110, 120, and 130. The various devices are secured by registering users 101, 102, and 103 as registered users for those devices. The registration information can be stored at server 140. When it is time to verify the identity of a user, the device can obtain verification information from the user, and transmit the information up to server 140 to be used in the verification procedure. In contrast to a typical situation in which a single user is assigned to a single device, such as in the case of a personal smartphone or workstation, system 100 illustrates a situation in which multiple users are registered to access a single device and a single user is registered to access multiple devices. As illustrated, each user is registered to operate at least two devices, and users 101, 102, and 103 are all registered to use device 120. An example of this kind of system is one in which a single employer registers multiple employees to use various devices at their workplace. For instance, devices 110 and 120 could be point of sale (POS) terminals used at a single store and users 101 and 102 could be check-out clerks at the store.

Various issues arise if system 100 involves the registration and verification of users through biometric information. If devices 110, 120, and 130 are secured using biometric information, system 100 will store the biometric information at server 140 to conduct the verification procedure at the server as described above. However, this is problematic from a user perspective because users will generally be resistant to any system in which their biometric information is transported through a network or is stored externally from a single device. Furthermore, in some circumstances, the users will not have a direct relationship with the operator or owner of server 140. In a particular example, devices 110, 120, and 130 are issued to the users by an employer while a third party maintains and operates server 140 for the benefit of the employer. As such, the users will be even less likely to find it acceptable to store their biometric information on server 140.

In an alternative approach, biometric information can be stored locally on the devices themselves. However, this is a suboptimal solution as well. In the illustrated case, user 101 will then have to register with device 110 and device 120 separately. Devices secured using biometric information compound this inefficiency because the provisioning of biometric data can often involve a lengthy training procedure. As such, neither the remote storage of biometric information nor the independent storage of the biometric information on the devices is an optimal solution.

Approaches disclosed herein provide a network of biometrically secured devices without the aforementioned limitations. In specific approaches, biometric information is obtained for at least one user on a single device, such as device 120, but the data is then made available on alternative devices within the same network. The biometric data can be transmitted directly between devices or it can be transmitted to a server 140 and then delivered to other devices in the network. However, through specific approaches disclosed herein, the data is never available in unencrypted form on server 140 and server 140 is never in possession of a key for decrypting the encrypted biometric data. Therefore, the biometric data can be used to obtain access to multiple device on the network without the user needing to conduct a time consuming biometric training procedure on more than one device. After training a single device, there is a seamless integration of the biometric data across multiple devices without the need to train each subsequent device.

The biometric information can include fingerprint data, hand size data, retina data, iris data, facial recognition data, vocal signature data, or any other kind of biometric information. The devices can be any kind of electronic device for which a specific set of users are granted access. Devices 110, 120, and 130 can be a network of devices that are administrated by a single entity such as an employer of users 101, 102, and 103. This single entity can be referred to as the network owner. As mentioned previously, a third party can also be responsible for the operation of server 140. This third party can be referred to as the network administrator.

In specific approaches, biometric information is stored on server 140 in an encrypted format while the actual verification of the stored biometric information against a sample of biometric data provided by a user is performed at the device. The stored biometric information used in the verification process (e.g., the data that represents a fingerprint provided during an initial enrollment process) can be referred to as the reference biometric information. The sample biometric information provided when a user is requesting access (e.g., the data that represents a fingerprint provided by the user during a subsequent verification procedure) can be referred to as the sample biometric information. The verification process can be conducted on a secured portion of the device that is isolated from the other functionality of the device such that neither the sampled biometric information nor the reference biometric information are ever exposed to the general operating system of the device itself in unencrypted form. The secured portion of the device could be a secure execution environment including a secure processor and a secure memory that is only accessible to the secure processor.

In one embodiment, a method is disclosed. The method includes obtaining, using a first sensor on a first biometrically secured device, a first sample of a first biometric. The method also includes generating, using a first secure execution environment on the first biometrically secured device, a secret biometrically derived key using the first sample of the first biometric. The method also includes encrypting, using the first secure execution environment and the secret biometrically derived key, a set of biometric data to produce a set of encrypted biometric data. The method also includes transferring the set of encrypted biometric data from the first biometrically secured device to a second biometrically secured device. The method also includes obtaining, using a second sensor on the second biometrically secured device, a second sample of the first biometric. The method also includes generating, using a second secure execution environment on the second biometrically secured device, the secret biometrically derived key using the second sample of the first biometric. The method also includes decrypting, using the second secure execution environment and the secret biometrically derived key, the set of encrypted biometric data. The set of biometric data uniquely identifies at least two users that are registered to use the first biometrically secured device.

In another embodiment, a system is disclosed. The system includes a first biometrically secured device having a first sensor and a first secure execution environment. The system also includes a first memory system in the first biometrically secured device storing instructions to: (i) obtain a first sample of a first biometric using the first sensor; (ii) generate, using the first secure execution environment, a secret biometrically derived key using the first sample of the first biometric; (iii) encrypt, using the first secure execution environment, a set of biometric data using the secret biometrically derived key; and (iv) transmit the set of encrypted biometric data to the second biometrically secured device. The system also includes a second biometrically secured device having a second sensor and a second secure execution environment. The system also includes a second memory system in the second biometrically secured device storing instructions to: (i) obtain a second sample of the first biometric using the second sensor; (ii) generate, using the second secure execution environment, the secret biometrically derived key using the second sample of the first biometric; and (iii) decrypt, using the second secure execution environment, the set of biometric data using the secret biometrically derived key. The set of biometric data uniquely identifies at least two users that are registered to use the first biometrically secured device.

Some of the disclosed approaches improve the fields of electronic access control and computerized user verification by providing enhancements in terms of both convenience and added privacy protection as compared to prior approaches. Achieving the efficient provisioning of biometric information to a network of devices without providing the biometric information in unencrypted form or a key for that encryption to a centralized server on the network is a technical problem. The disclosed approaches include a set of aspects that contribute to a solution to that technical problem. In particular, the specific onboarding and access administration approaches described above are technical solutions that transmit, encrypt, and process information among the various nodes of the network in an inventive manner to solve the aforementioned technical problem. Each of the disclosed approaches described above involving onboarding a first biometrically secured device can include providing access to the first biometrically secured device by comparing sample biometric data from a user to reference biometric data provided by that same user on the second biometrically secured device.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Figure 1:
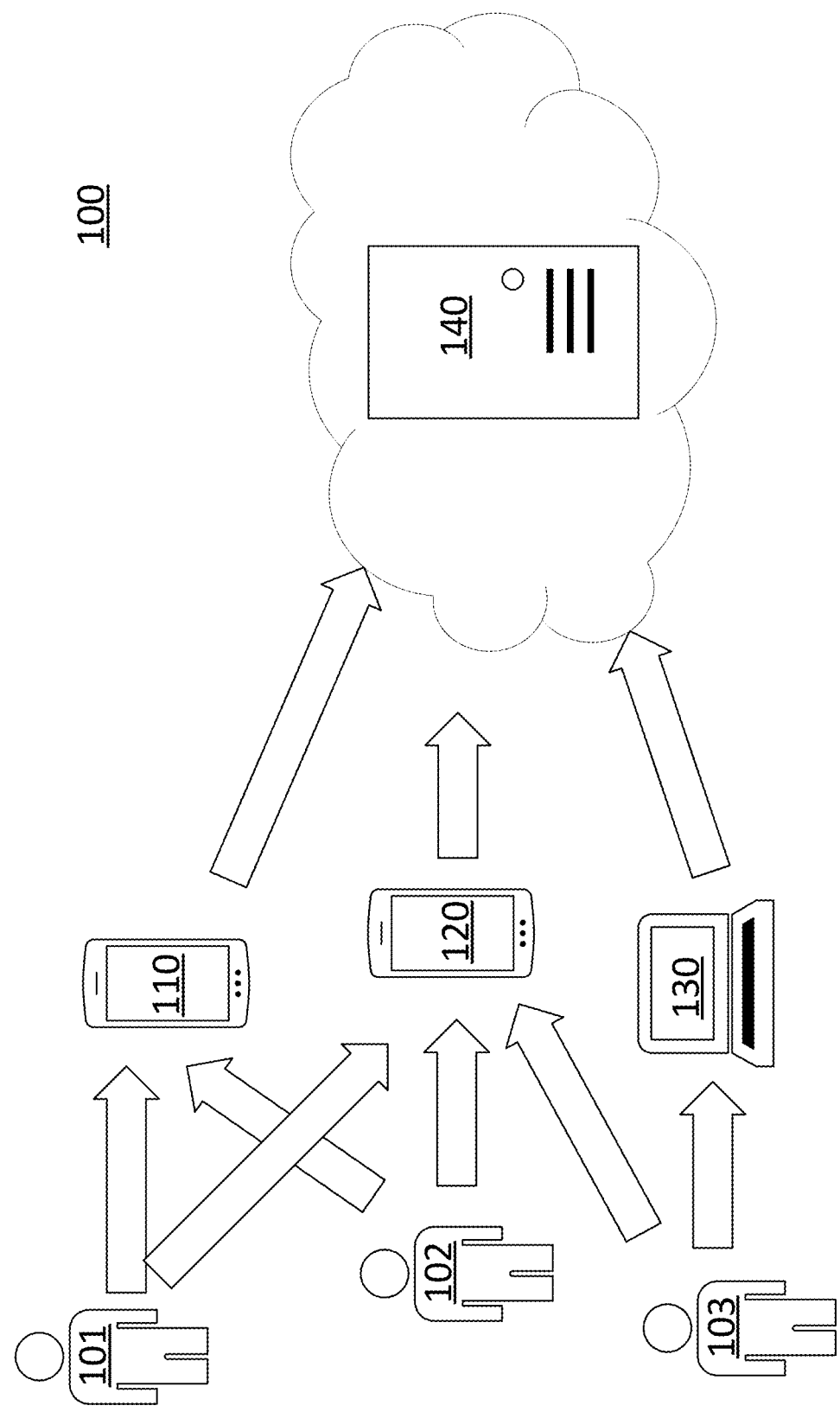
FIG. 1 illustrates a multiuser network of secured devices in accordance with related art.
Figure 2:
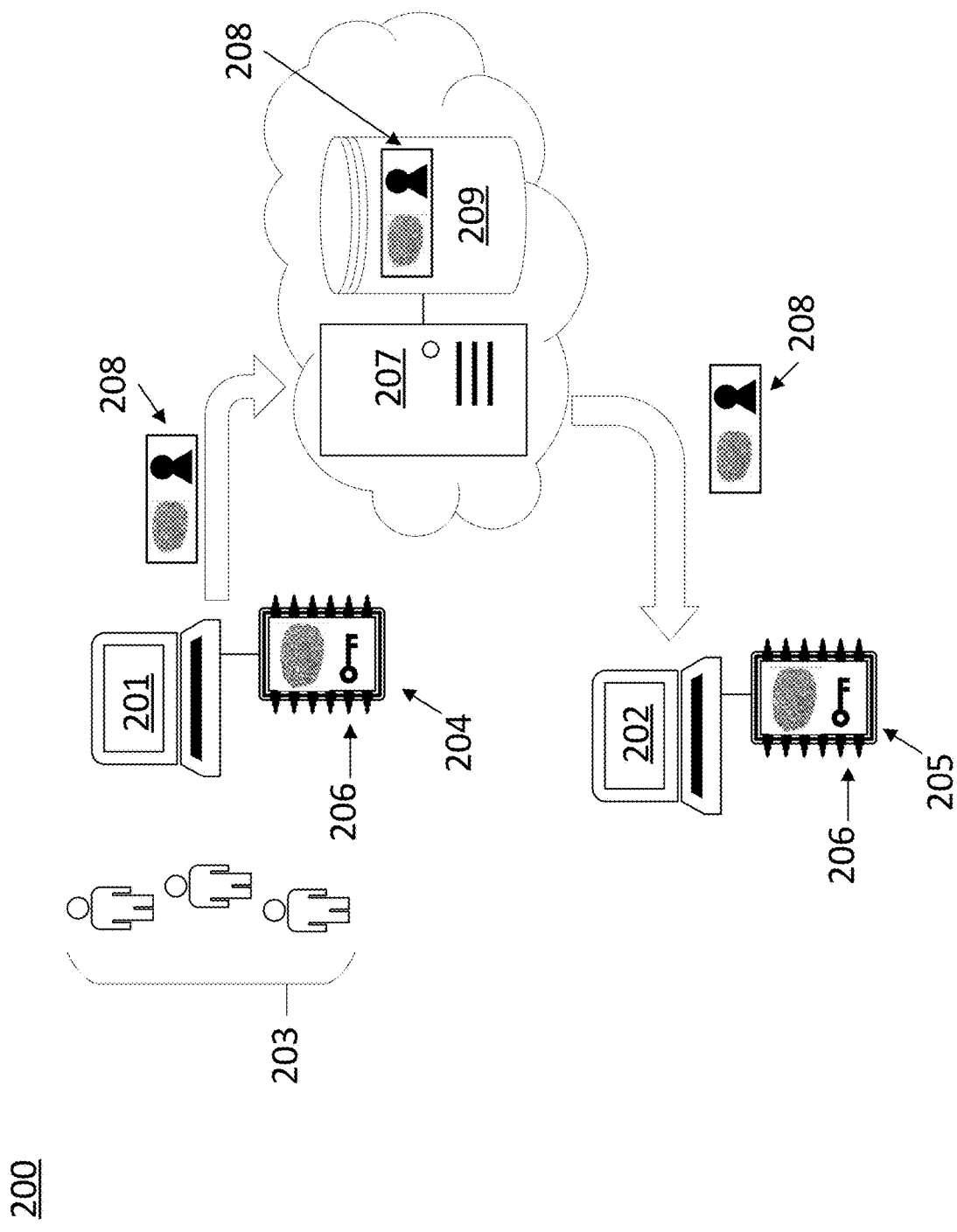
FIG. 2 illustrates a block diagram of a network of two biometrically secured devices in accordance with certain approaches disclosed herein.

FIG. 2 illustrates a block diagram of a network 200 with two biometrically secured devices 201 and 202. Network 200 is configured to allow a user to register biometric information with device 201 and then log into either device 201 or 202 interchangeably without having to separately register with device 202. Also, devices 201 and 202 can be interchangeably operated by any user in group 203 after those users have verified their identity with the device (i.e., the devices are multiuser devices). For example, devices 201 and 202 could be provided by an employer to its employees to be used interchangeably by the employees during their respective shifts. The devices could be POS terminals or any other work-related devices such as a time card machine, specialized tablet, or employee access verification system. The devices could alternatively be identity verification devices or communal devices used in public spaces such as turnstiles in a public transportation setting.

Devices 201 and 202 include respective secure execution environments 204 and 205. Although secure execution environments 204 and 205 are illustrated as standalone integrated circuits, they can be standalone hardware units or instantiated as secured privileged modes on the main processors of devices 201 and 202. The execution environments may be capable of administering an enrollment procedure at the device in which reference biometric information is obtained from a user. Not all of the devices in any given network 200 need to be capable of enrolling a user, and the benefits described herein will still be applicable. For example, network 200 can include specialized enrollment devices that are configured to obtain reference biometric information efficiently while other devices in the network are only capable of obtaining sample biometric information for a verification procedure. The enrollment procedure can include a training procedure in which a user provides multiple samples of biometric information to the device. For example, the user can provide multiple vocal samples in response to prompts offered by the device or multiple fingerprint scans provided to a fingerprint reader on the device. The biometric data provided by the user will then be stored as the reference biometric data for that user on the device itself. A unit of biometric data that is computer-readable and capable of serving as the sample or reference biometric information can be referred to as a biometric data element. In certain approaches, the secure execution environment will store the reference data in a secure memory that is only addressable by the secure execution environment. A specific approach for the secure execution environment is described below with reference to FIG. 3.

Once a user in group 203 completes an enrollment procedure on device 201, the reference biometric data stored in secure execution environment 204 can be used during an identity verification procedure when the user returns to device 201 at a later time. The identity verification procedure can also be conducted on secure execution environment 204. However, the same user can also conduct the identity verification procedure on device 202 without having to conduct a new enrollment procedure on device 202. Through the approaches described below, both device 201 and 202 will have access to a master encryption key 206 that is used to encrypt and decrypt the reference biometric data. However, server 207 will never have access to master encryption key 206. Therefore, the encrypted reference biometric data 208 can be transmitted from device 201 to server 207, stored in database 209, and delivered to device 202 without server 207 ever having access to the biometric data in unencrypted form, or the means to decrypt the biometric data.

Server 207 can be any system of software and suitable computer hardware that is capable of responding to requests across a network to provide a network service. Although, server 207 is illustrated as a single unit of physical hardware, server 207 may comprise multiple physical hardware units. The physical hardware units can include personal computers, workstations, and dedicated enterprise server blades. The physical hardware units can be in a single physical location such as an office or data center, but they may also be located at separate data centers or offices. The server 207 can be a virtualized server. Individual network services can be provided by individual servers or multiple servers, as well as individual units of physical hardware or multiple units of physical hardware. The server can be an on-premises web server utilized by a single network owner. However, the server can also be an off-premises web server located at a data center and administrated by a network administrator for the benefit of a single network owner or multiple network owners.

Figure 3:
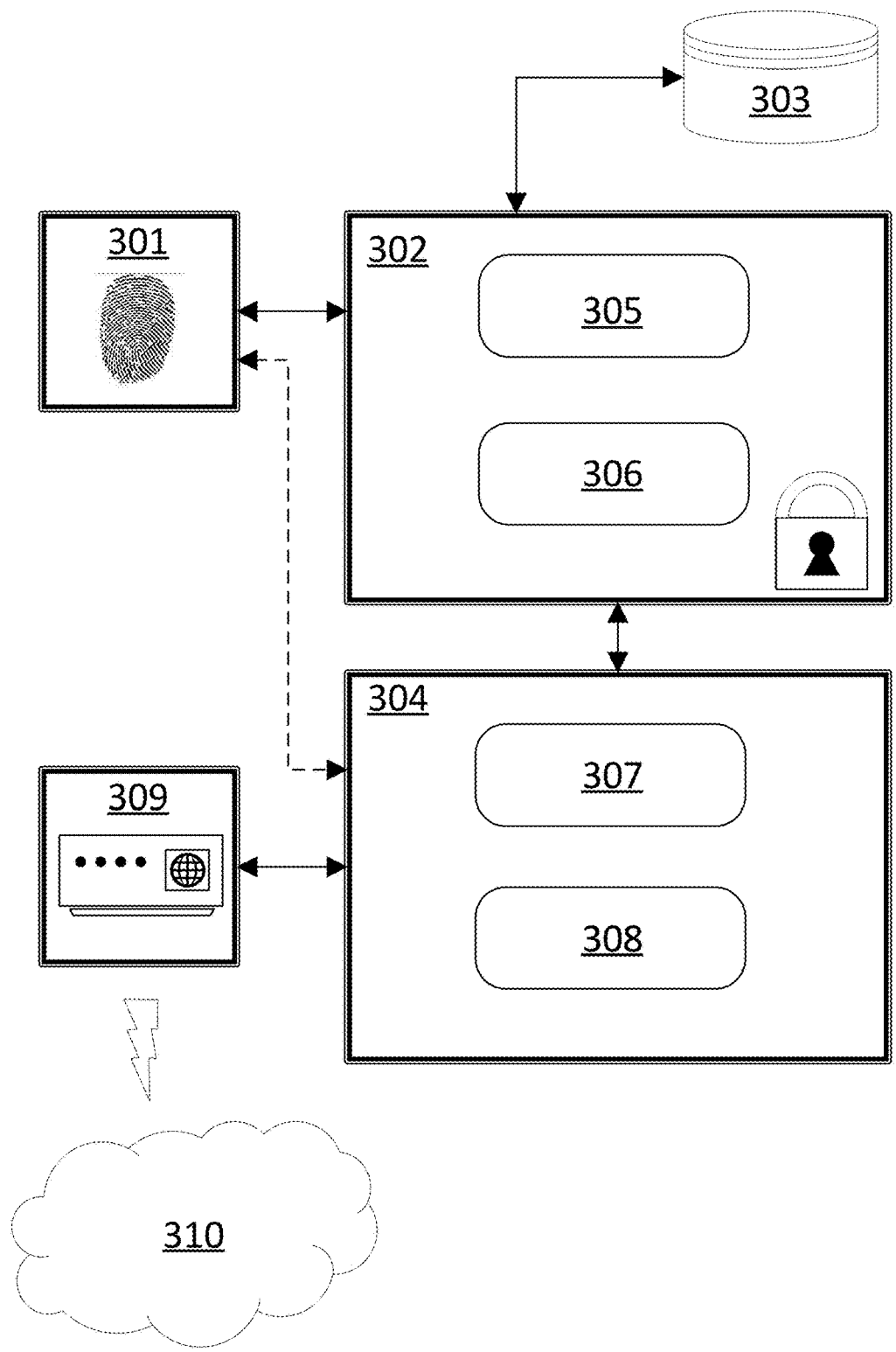
FIG. 3 illustrates a block diagram of an exemplary architecture for the biometrically secured devices in FIG. 2.

An exemplary architecture 300 for devices 201 and 202 is illustrated in FIG. 3. As mentioned previously, devices 201 and 202 do not need to be homogenous and indeed certain benefits accrue to approaches in which one of the devices is capable of conducting a specialized rapid enrollment procedure. For example, one device in the network could have a more accurate biometric sampling peripheral that is more conducive to obtaining sample biometric information. However, each device in the network should be capable of conducting a verification procedure. For example, device 202 should be able to compare sample biometric information obtained at device 202 with reference biometric information obtained at device 201. Sample biometric data can be obtained by a peripheral, which may be any sensor including an external or integrated peripheral such as a touch screen built into the device. The data from the peripheral can be routed to a controller 301. The controller can be a dedicated interface for operating the peripheral. For example, if the peripheral were a touch screen, the controller could be a stand-alone touch controller integrated circuit. The sensor can be a hand size reader, finger print reader, iris scanner, or any auditory or optical sensor. In certain approaches, the controller 301 will have a direct connection to a secure execution environment 302.

The direct connection between controller 301 and secure execution environment 302 can be a variable connection. As such, the same peripheral can be used to obtain sample biometric information as well as operate the device. Any user interface that can be used to both provide commands and obtain biometric data can be utilized for these purposes. For example, a touch screen can be used to obtain fingerprint data for direct delivery to the secure execution environment, but can also be used to send user commands to the general operating system. As another example, a camera used in gesture recognition can also obtain an image of a user's face to obtain facial recognition biometric data. As another example, a microphone for obtaining voice commands could be used to obtain vocal biometric data. The phantom line between controller 301 and standard execution environment 304 is provided to illustrate this concept. However, in other approaches controller 301 may have a dedicated connection to both execution environments. In still further approaches, controller 301 and indeed the peripheral itself may be used exclusively by the secured execution environment such as in a workstation with a fingerprint reader that is used solely for biometric registration and verification.

Secure execution environment 302 can carry out the biometric comparison and biometric information management procedures for the overall service. Secure execution environment 302 may include a secure memory 303 that is only addressable by the secure execution environment. Secure execution environment 302 may also be instantiated using a dedicated secure processor located on the device. A separate standard execution environment 304 on the device will be responsible for instantiating the operating system for the device. The standard execution environment 304 could be instantiated by a separate standard processor located on the device. As non-limiting examples, the operating system could be an iOS or Android operating system. The secure execution environment 302 will operate on a higher level of privilege than the standard execution environment 304, thus providing greater data security and integrity to the secure execution environment. In certain approaches, secure execution environment 302 and standard execution environment 304 could be instantiated on the same processor. In these approaches, secure execution environment 302 could be a privileged execution mode on the main processor of the device. The secure memory 303 can be used to store the reference biometric information for users that have been enrolled with the overall network. In certain approaches, the secure memory 303 will only be addressable by the secure processor and will not be addressable by the standard processor. Secure execution environment 302 can include another alternative memory to store instructions for executing the functionality of the secure execution environment. This memory could be secure memory 303 or an alternative memory which could be a nonvolatile memory that is also only addressable by secure execution environment 302 or that otherwise stores instructions that are only executable by secure execution environment 302.

Secure execution environment 302 may include a matching engine 305 and a user management component 306. The matching engine 305 and user management component 306 may be instantiated by the secure processor and alternative memory mentioned above. The matching engine 305 will conduct a comparison of the reference and sample biometric information for a particular user during a verification procedure. The matching engine 305 can utilize a probabilistic algorithm to conduct the comparison. The user management component 306 will administrate the storage and acquisition of biometric information for particular users in the secure execution environment 302.

User management component 306 could be configured to administrate the process of obtaining reference biometric data for a new user by controlling prompts to the user on the device and receiving biometric data via controller 301. User management component 306 could be configured to receive additional reference biometric data from the server, determine if the associated user was already registered by secure execution environment 302, and store or discard the additional reference biometric data based on that comparison. User management component 306 could also push newly obtained reference biometric data up to a server so that it is available to the network as a whole, or respond to intermittent or periodic requests from the server for newly obtained reference biometric data. To facilitate these processes, the biometric data could be stored with a corresponding identifier for the user which could comprise a string of data such as a user name or arbitrary number identifying the user internally to the secured execution environments on a given network. During a registration procedure, the user management component 306 could create this string. Such a registration procedure may involve a communication with the server to assure that a given user identifier was available for use on the network.

Standard execution environment 304 can include a processor and a memory for instantiating the operating system of the overall device. Standard execution environment 304 may include a login engine 307 and a network engine 308. The login engine 307 and network engine 308 may be instantiated by the processor and memory of standard execution environment 304. As mentioned above, the standard execution environment could also be tasked with instantiating an operating system for the overall device.

Login engine 307 can function in combination with user management component 306 to administrate the enrollment procedure for a new user or the verification procedure for a returning user. The degree to which these separate modules participate in these procedures can vary. In one situation login engine 307 merely monitors the state of the overall operating system to determine when an enrollment or verification procedure has been triggered and indicates this fact to management component 306 to conduct the bulk of the procedures. Regardless of how the functions are split between the two components, the biometric data will not be accessible to login engine 307 in unencrypted form.

Network engine 308 can likewise function in combination with user management component 306 to administrate communication between the device and server 310 via network adapter 309. Networking engine 308 will transfer encrypted data to and from server 310 via network adapter 309. In particular, user management component 306 and networking engine 308 can intermittently, or periodically, send a request to poll server 310 to pull the biometric data for newly registered users that registered on other devices from the server 310, or push the biometric data for newly registered users that registered on the device to the server 310. User management component 306 and networking engine 308 can also intermittently, or periodically, receive requests from server 310 to accept biometric data for newly registered users that registered on other devices from server 310, or transmit the biometric data for newly registered users that registered on the device to server 310.

Figure 4:
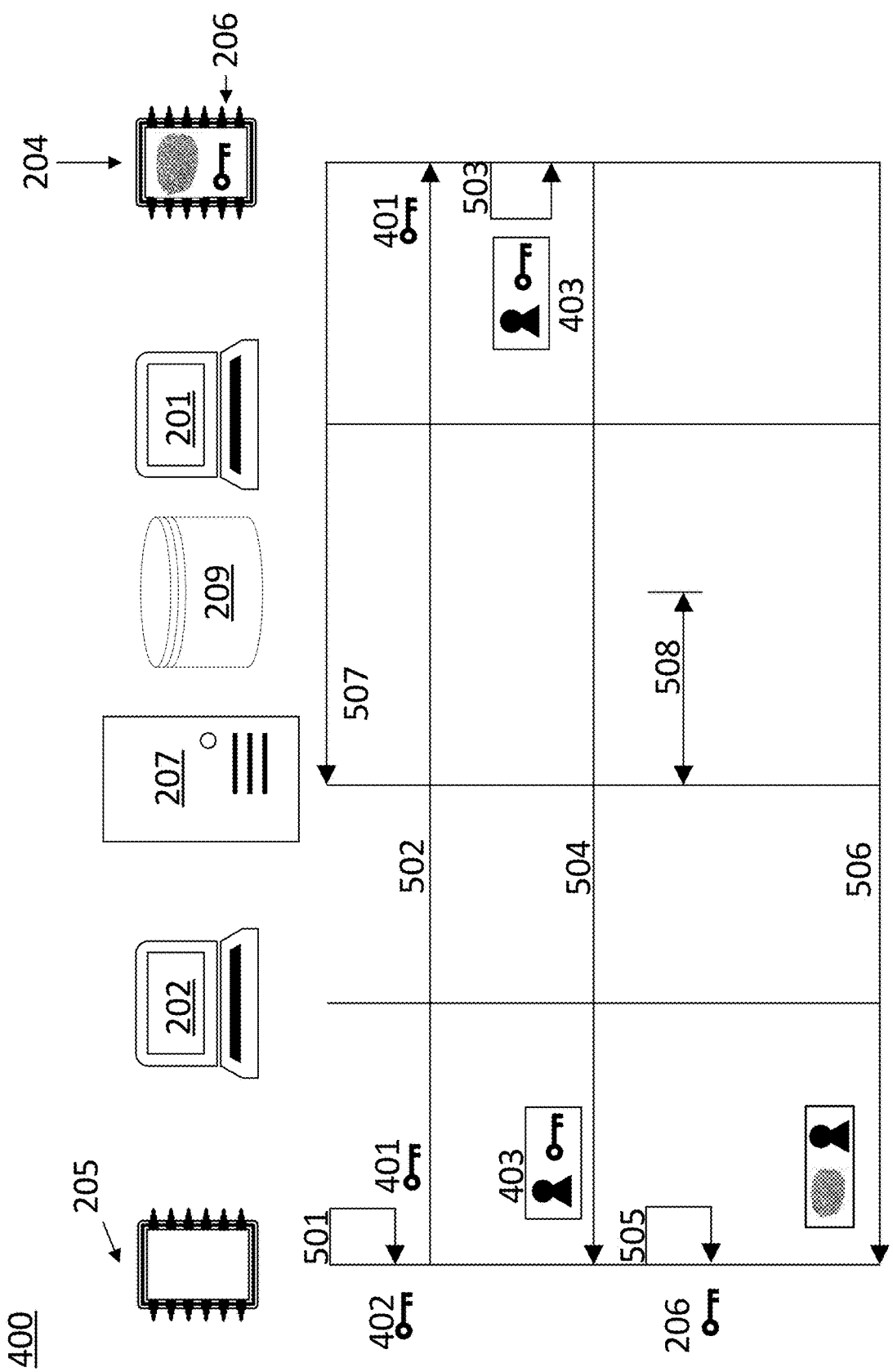
FIG. 4 illustrates a ladder diagram for a set of methods for onboarding a first biometrically secured electronic device to a network in accordance with certain approaches disclosed herein.
Figure 5:
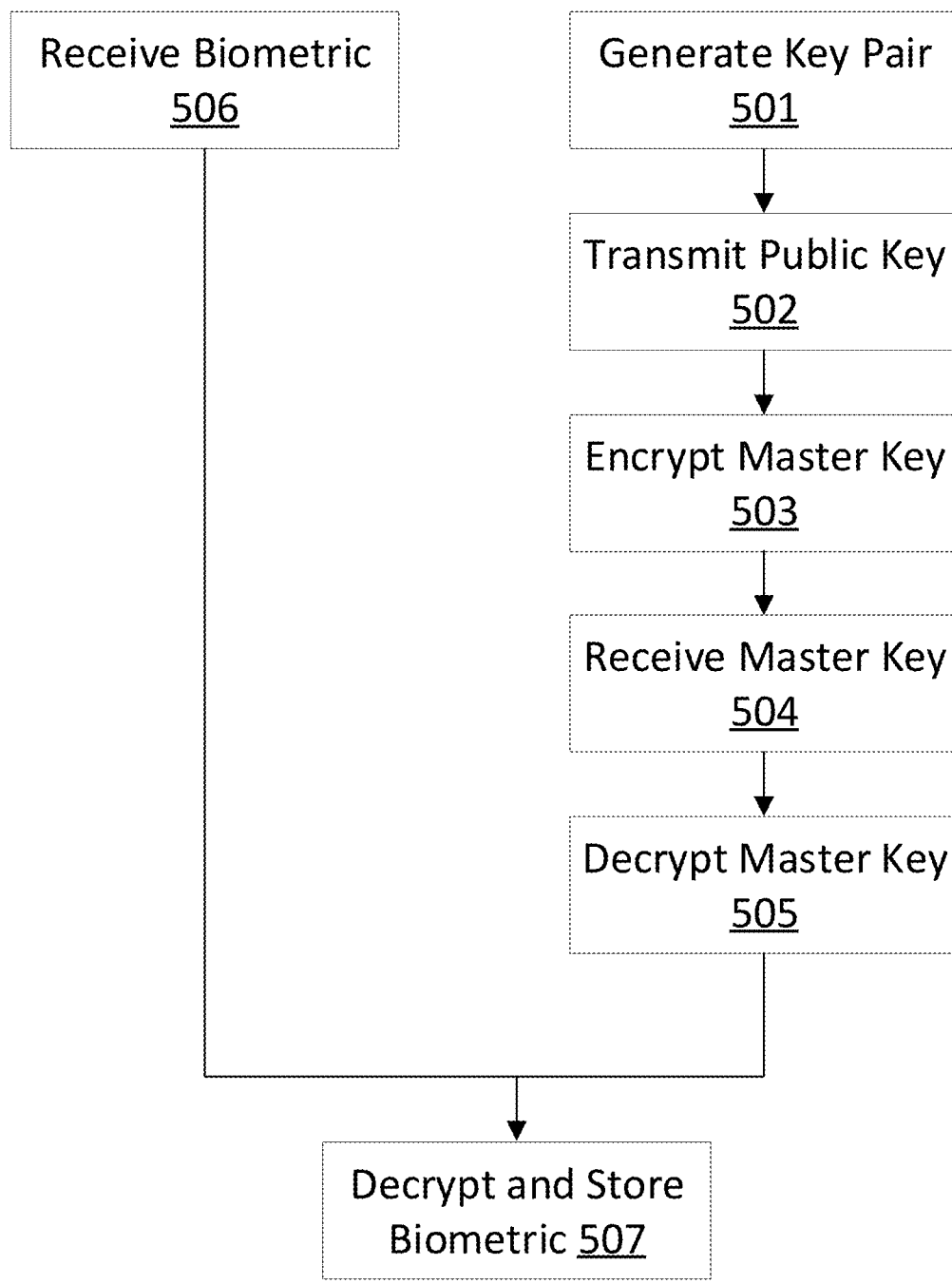
FIG. 5 illustrates a flow chart for a set of methods for onboarding a first biometrically secured electronic device to a network in accordance with certain approaches disclosed herein.

FIGS. 4 and 5 illustrate a ladder diagram 400 and flow chart 500 for a set of computer-implemented methods for onboarding a first biometrically secured electronic device to a network. Each of the nodes in the ladder diagram can store instructions to execute the steps associated with those nodes using a processor and a memory. The network can comprise devices 201 and 202 including secure execution environments 204 and 205. Devices 201 and 202 can communicate directly or through a server such as server 207. As illustrated, device 202 is being on-boarded to the network. Device 202 can be a newly purchased device that an employer or other network owner would like added to their system. As a result, device 202 does not include any stored biometric information and does not include an encryption key. As illustrated, device 201 is already part of the network and includes a master encryption key and set of biometric reference data stored on secured execution environment 204. The initial onboarding process for device 201 is discussed later in FIGS. 12 and 13. However, for purposes of a discussion of ladder diagram 400 it can be noted that neither the biometric information nor the master encryption key were provided to device 201 from the network. The biometric information on device 201 was input to the device directly or was transmitted to device 201 through the same procedure that is about to be described with reference to device 202. The master encryption key itself can be generated on device 201 itself. This key generation process can be conducted after the device has been placed into service so that the key is not available even to the network administrator or manufacturer of the device.

In step 501, a secure processor on device 202 is used to generate an asymmetric key pair including a private key 402 and a public key 401. The asymmetric key pair can be generated using RSA, Diffie-Hellman, ElGamal, ECC, or any other asymmetric encryption algorithm. The generation procedure can be conducted solely within a secure execution environment such as the one described with reference to FIG. 3. As such, the private key will never be accessible to the network or the operating system of the device itself.

In step 502, the public key 401 generated in step 501 is transmitted to device 201. The step can include transferring the public key to a buffer on device 202. This transmission can be conducted via direct communication between the devices. As illustrated, the communication takes place via the network controller of devices 201 and 202, and server 207. Those of ordinary skill in the art will recognize that a public key can be used to encrypt information, but that only the private key of an asymmetric key pair can decrypt information generated using the public key. In step 503, the public key 401 delivered to device 201 is utilized to encrypt master encryption key 206. This encryption procedure can be conducted entirely within secure execution environment 204.

In step 504, device 202 receives the encrypted master encryption key 403 from device 201. Encrypted master encryption key 403 is the master encryption key 206 as encrypted with public key 401. Although encrypted master encryption key 403 is in some approaches transmitted via server 207, the server 207 does not have access to the master encryption key 206 because it has been encrypted by public key 401 and can therefore only be decrypted by private key 402.

In step 505, encrypted master encryption key 403 is decrypted using private key 402 and the secure processor of device 202. In certain approaches, the decrypting will take place entirely within the secure execution environment 205 of device 202. As a result, the master encryption key 206 can be stored within a secure memory of device 202 without having been available to server 207 or the outside network generally.

In step 506, an encrypted set of biometric data is received at device 202. The encrypted biometric data can be received from server 207 after being pulled from a database 209 or after being sent from device 201. In other approaches the encrypted biometric data can be provided directly from device 201 to device 202. In either case, the set of biometric information will first be encrypted using the master encryption key 206 at device 201. The encrypted biometric data will then either be transmitted to server 207 for storage in database 209 and subsequent transmission to device 202, or transmitted immediately to device 202 after being encrypted.

In step 507, the set of biometric data is decrypted and stored on a memory of device 202. The memory can be a secure memory of secure execution environment 205. The step could consist essentially of writing the set of biometric data to the secure memory using the secure processor. The biometric data that is received in step 506 can be decrypted within the secure execution environment using master encryption key 206. The set of biometric data can correspond to one or more users. The set of biometric data can uniquely identify at least two users that are registered to operate both devices 201 and 202. The users can be users that registered using an enrollment process on device 201 or another device that transmitted the biometric information it collected to device 201 using a similar procedure to that described with reference to FIGS. 4 and 5. The network owner and network administrator will be able to coordinate the execution of the methods described with reference to FIG. 5 such that a user that conducts an enrollment process on device 201 will subsequently be registered to operate both devices 201 and 202.

After device 202 decrypts and stores the set of biometric data, a user that initially enrolled with the network via a registration process on a different device can seamlessly conduct an identity verification process on device 202. The verification process will comprise receiving, at device 202, a biometric login request. The biometric login request can be as simple as a user picking up a device with an integrated fingerprint scanning system such that the login request is conducted in an innocuous manner. Alternatively, the biometric login request can be more involved and require a user to identify themselves using non-biometric means such as a user name prior to biometric information being obtained from the user. The verification process will also comprise comparing, using a secured processor, data from the biometric login request with data stored on the device in step 507. The comparison can be conducted using the matching engine 305 operating on the data from the biometric login request and the data stored in step 507 as the reference biometric data. The verification process will also include authorizing access to the device based on the outcome of the comparison step. Access to the device can include being able to obtain access to information or functionality locked behind an electronic barrier that is controlled by the device, such as an operating system instantiated by the standard processor, or being allowed to pass through a physical barrier that is controlled by the device.

Network 200 can take on various forms. The network can include the Internet. The network can be a closed loop proprietary network, that does not have any external connection, on which server 207 is the central server. The nodes of the network can be connected using multiple networking technologies such as wired and wireless networks of varying protocols. In particular, if direct transmission is utilized to transfer information from device 201 to device 202, the network can utilize Bluetooth, Zigbee, WiFi, or some other wireless standard to transmit information. The specific WiFi standard could be WiFi-Direct. Direct transmission may require the devices to be placed in close proximity as one device is added to the network.

Direct transmission can involve sharing keys using a secure connection. The secure connection can be established using the entry of a single password on both the devices that share the connection. As such, the devices can be configured to receive a password from a user, and establish a secure connection after verifying that the password received via each device was a match. The devices can store instructions and be programmed to execute these steps. A wireless protocol can utilize the entry of the password on both devices as the basis for accepting and generating the secure connection. The protocol can involve a master device and a servant device. The protocol can include a discovery protocol that allows the master device to open a port for connecting. The servant devices can be programmed to search for the service port and connect to the master device. The master and servant can authenticate each other using certificates signed in a secure room in a factory that was used to produce the devices. The certificate chain can be verified, and the root certificate can be checked for authenticity by both devices before the secure connection is established. The master and servant can also authenticate each other using a password entered on both devices by a user. Upon verifying the identity of the servant, the master can generate a key, such an AES key, and send it to the servant. The key can be encrypted using the public key from the certificate that was verified in the initial handshake. All the certificate verification, key handling, and key generation can be conducted in the secure execution environment. The protocol could be WiFi-Direct or Bluetooth.

With reference to ladder diagram 400 in FIG. 4, the specific operation of the server and network adapters on the devices was left out of the methods of flow chart 500. However, if a particular network did utilize a server such as server 207, communication from one secure environment to the other would involve a receipt and transmission of information at each rung of ladder diagram 400. For example, a separate step 507 of receiving at the server the encrypted set of biometric data from device 2041 could precede all of the steps in both FIGS. 4 and 5. The data could then be stored and retrieved to and from database 209 as shown by step 508 in FIG. 4. The encrypted master encryption key could likewise be stored in database 209 using a similar approach. In these approaches, step 506 could be limited to a transmission from server 207 to device 202. In addition, steps 502 and 504 would each involve substeps of receiving data and transmitting that data from the server.

Utilization of server 207 provides certain benefits in that the central server can administrate the synchronization of biometric information for a set of users across the network as they are received from multiple devices. As mentioned previously with reference to the network adapter of FIG. 3, the devices can operate in combination with the server to push and pull new biometric data to and from the servers and devices to assure that all of the devices are kept up to date. This approach can prevent a user from having to conduct a training procedure at one device even though they have already been registered on the network by conducting an enrollment procedure at one of the other devices on the network. In these approaches, new biometric data elements that are received on a device, such as device 202, will be encrypted on the secured execution environment of the device, and then transmitted to the server for storage on database 209. Also, since the devices may be located at different physical locations such as multiple stores or offices of a single enterprise, a server may be necessary to transmit the encrypted biometric information across the network. Furthermore, devices might not be activated at the same time of day so the biometric information that they store might not be available for synchronization with other devices unless they are administrated and stored at a central location that is more generally available.

Figure 6:
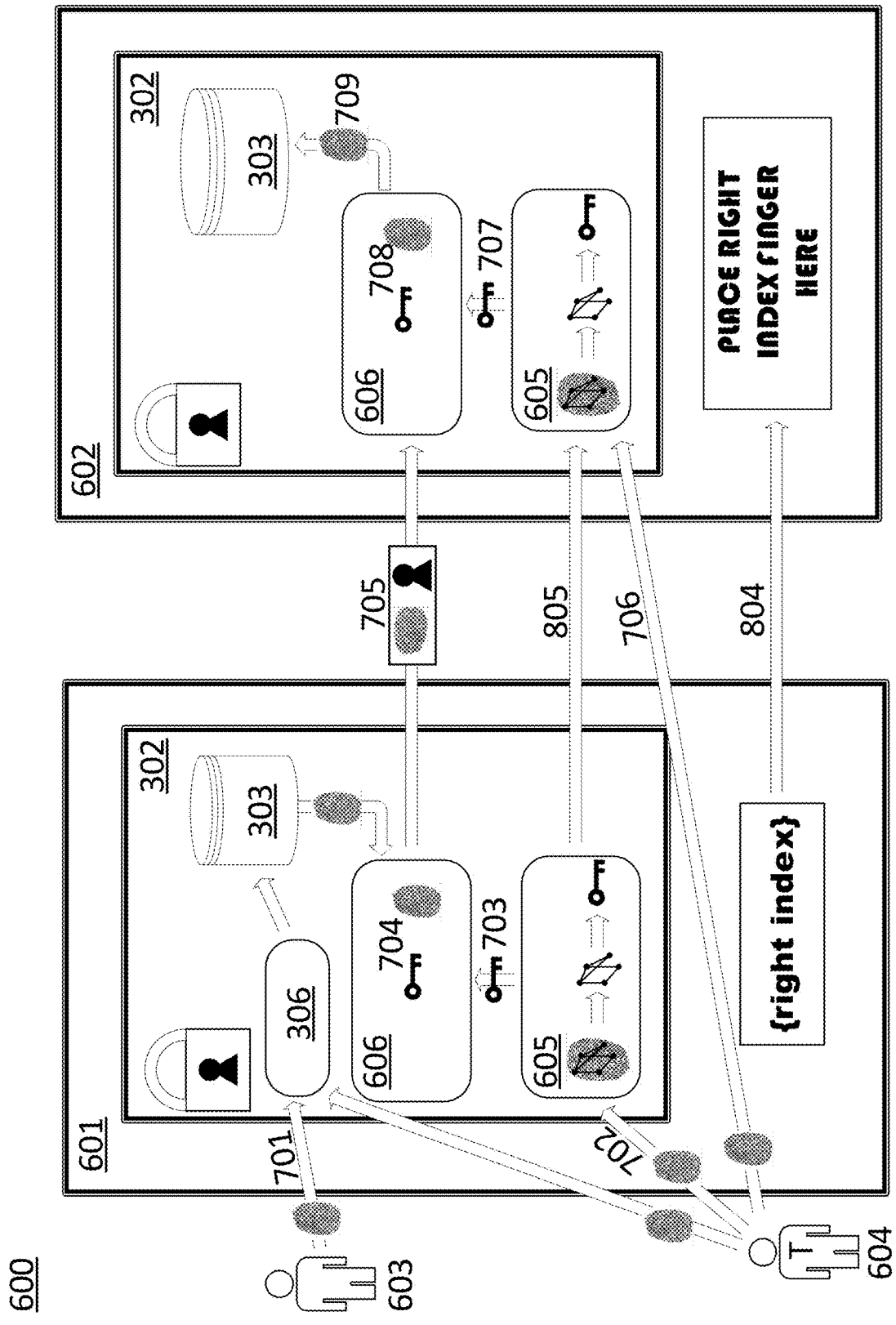
FIG. 6 illustrates a block diagram of a system used to onboard a second biometrically secured electronic device to a network using a biometrically derived secret key in accordance with certain approaches disclosed herein.
Figure 7:
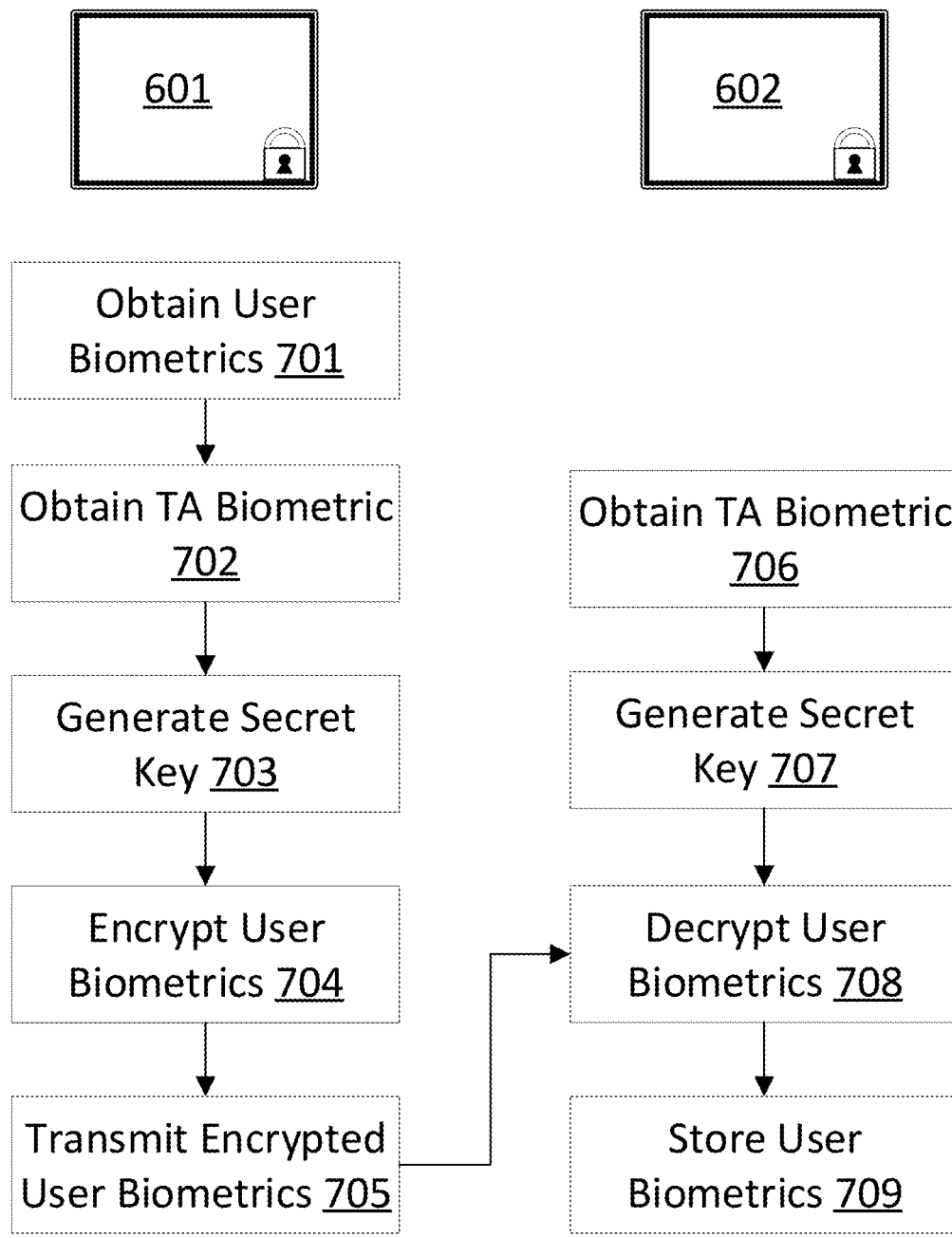
FIG. 7 illustrates a flow chart for a set of methods for onboarding a second biometrically secured electronic device to a network using a biometrically derived secret key in accordance with certain approaches disclosed herein.
Figure 8:
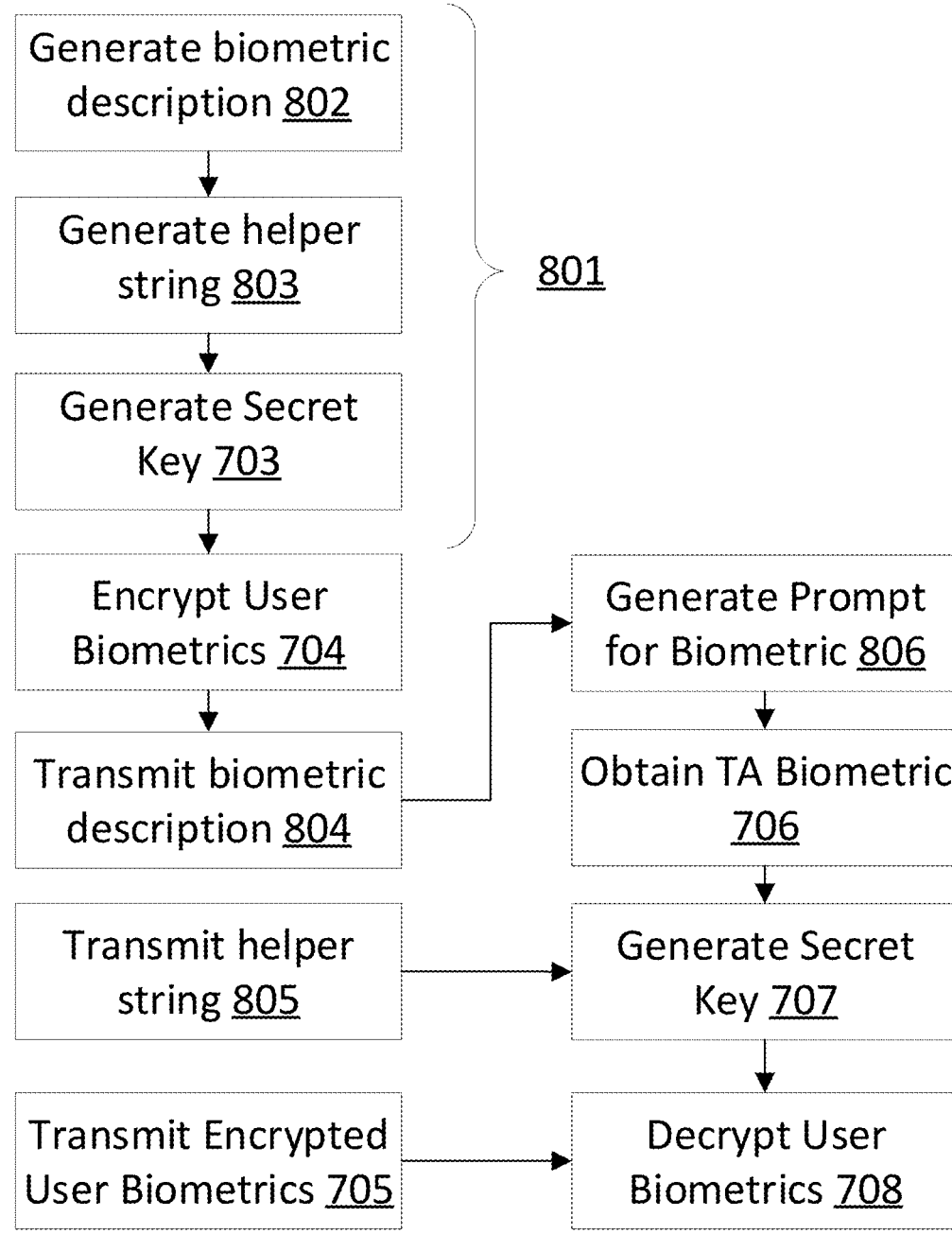
FIG. 8 illustrates a flow chart for a set of methods for deriving a biometrically derived secret key on a first biometrically secured electronic device and a second biometrically secured electronic device in accordance with certain approaches disclosed herein.

FIGS. 6, 7, and 8 illustrate a block diagram 600 and two flow charts 700 and 800 that can be used to describe another set of computer-implemented methods for onboarding a biometrically secured electronic device to a network. Each of the blocks in the block diagram can store instructions to execute the steps associated with those nodes using a processor and a memory. Block diagram 600 includes a first biometrically secured device 601 and a second biometrically secured device 602. The devices can exhibit the same features as those referred to in FIG. 2. In addition, the devices can be connected in the same way that the devices are described as connected above with reference to FIGS. 2-5 including through an intermittent server or via a direct connection. The devices both include a secure execution environment 302, memory 303, and user management component 306, all of which can exhibit the same features as described with reference to FIG. 3. User management component 306 can assist device 601 and 602 in obtaining biometrics from users 603 and 604. However, devices 601 and 602 additionally include a fuzzy extractor 605 and an encryption module 606 that are each instantiated within the secure execution environment. As mentioned previously, the two devices can be identical devices in a network of biometrically secured devices, or first device 601 can be a specialized device for enrolling users to the network (e.g., a specialized terminal in a human resources office) while second device 602 is a device in the network that offers the core functionality of the network (e.g., a POS device, a biometrically secured terminal, or a biometrically secure turnstile).

The approach described with reference to FIGS. 6-8 differs in that there are two classes of users involved with the onboarding of devices to the network. As illustrated, users 603 and 604 can provide a biometric, such as a finger print, to first biometrically secured device 601. These biometrics can be stored along with a set of biometrics in memory 303. As above, the set of biometric data can uniquely identify at least two users that are registered to use the first biometrically secure device. The set of biometrics can be used as reference data for later access requests. However, the biometric provided by user 604 can also be used to aid in the efficient onboarding of additional devices to the network.

User 604 also serves as a transfer agent in the types of networks represented by block diagram 600. As illustrated, user 604 provides a biometric to fuzzy extractor 605 on device 601 and also provides the biometric to fuzzy extractor 605 on device 602. The user provides the same biometric to both devices and does so while physically present at each of the devices. The biometric provided by user 604 is then used by each device to generate a secret biometrically derived key which is used to encrypt and decrypt the set of biometric data that is used to access the network. The secret biometrically derived key generated from the transfer agent's biometric can subsequently be used in a similar fashion to master encryption key 206 in FIG. 2. The set of data used to access the network can include biometrics from both user 603 and 604, or just user 603. The set of data used to access the network can also include biometrics from numerous other individuals that are meant to be registered with the network and that do not serve as transfer agents. In contrast to the requirements placed on user 604, user 603 and other users that are not transfer agents do not need to be physically located at device 602 for that device to be onboarded to the network.

The disclosed system can be used to securely onboard additional devices to a biometrically secure network without each user needing to register their biometric data with each device separately. The set of biometric data used to access the network can be referred to as the set of biometric access data. As mentioned above, the set of biometric data can be used as reference data to control access to the devices themselves, to control access to particular functions of the device, or to control access through a physical barrier controlled by the device. Using the disclosed approach, the set of biometric access data can move directly from a sensor on device 601, to secure environment 302 to be stored in memory 303, and can then be distributed to any number of additional devices without ever existing outside of the network's secure execution environments in unencrypted form. The resulting system exhibits many of the benefits described with reference to FIG. 2-5 with the added benefit that it is impervious to spoofing by third parties that pose as legitimate potential recipients of the encrypted biometric data. This is because only devices that receive the biometric from the transfer agent are able to decrypt the set of biometric data. Furthermore, even the transfer agent will be unable to remove the biometrics from secure execution environment 302 to decrypt them separately because the biometrically derived key is likewise never available outside of the secure execution environments. Finally, the secret biometrically derived key can be derived from multiple user's biometrics as an additional layer of security.

FIG. 7 includes a flow chart 700 for a set of methods for onboarding a biometrically secure device to a network using a secret biometrically derived key. One implementation of flow chart 700 can be described with reference to FIG. 6 where the steps on the left side of flow chart 700 are executed by device 601 and the steps on the right side of flow chart 700 are executed by device 602 in FIG. 6. Flow chart 700 involves step 701 of obtaining a set of biometric data using a sensor on first biometric device 601. The set of biometric data can be data representing finger prints for a collection of at least two users that are registered to use device 601. The set of biometric data can be a set of biometric access data and can include biometric data from transfer agents. Flow chart 700 also involves step 702 of obtaining a first sample of a first biometric using a sensor on first biometric device 601. The first biometric may be a biometric of transfer agent 604. Step 702 can be executed using a sensor on device 601 that delivers the biometric data representative of the first biometric to fuzzy extractor 605 on device 601. Flow chart 700 continues with step 703 of generating, using secure execution environment 302, a secret biometrically derived key using the first sample of the first biometric obtained in step 702. Examples of how a secret biometrically derived key can be generated are provided below with reference to FIGS. 9-10.

The secret biometrically derived key generated in step 703 can be used to encrypt the set of biometric access data stored on device 601. In other words, the process involves generating a key from a biometric which is in turn used to encrypt a set of biometric information. One benefit of this approach for providing additional privacy protection to a biometrically secured network is that the devices in the network will already be configured to accept biometrics so they will naturally include the hardware necessary to facilitate this encryption and distribution process (i.e., the sensor that is used in step 702 can be the same sensor used in step 701). Step 704 involves encrypting the set of biometric access data using the first secure execution environment and the secret biometrically derived key to produce a set of encrypted biometric data. Any symmetric encryption algorithm can be applied to execute step 704 such as triple DES, Blowfish, Serpent, Twofish, AES and others. Subsequently, step 705 can involve transmitting the set of encrypted biometric data from first biometrically secure device 601 to second biometrically secure device 602. The transmission of the encrypted data can involve a transfer directly from device 601 to device 602 or a transfer through an intermittent server.

In order for device 602 to be onboarded to the biometrically secured network, device 602 will need to decrypt the encrypted set of biometric data. As such, flow chart 700 includes step 706 of obtaining a second sample of the first biometric. In block diagram 600, the second sample of the first biometric is provided by transfer agent 604. The biometric can be the same finger print provided in step 702, but be provided to a sensor on device 602 as opposed to a sensor on device 601. The sample can be a second entry of a finger print of transfer agent 604 provided later while transfer agent 604 is in the same locale as device 602. The second sample can be obtained using a sensor on device 602, and the data associated with the sample can be provided directly to secure execution environment 302 on device 602. The sample can be provided to fuzzy extractor 605 on device 602.

Flow chart 700 continues with step 707 which involves the generation of the secret biometrically derived key using the secure execution environment on device 602 and the second sample of the fist biometric. As will be described below, using the approaches described herein two different samples of the same biometric are provided to sensors on two different devices, but the same secret biometrically derived key is generated therefrom internally on both devices. As a result, the two devices can execute a symmetric encryption and decryption procedure on the set of biometric access data even though the symmetric key was never available outside the secure execution environments of the two devices.

Flow chart 700 continues with step 708. In step 708, the set of biometric access data transmitted in step 705 is decrypted on second device 602 using the secret biometrically derived key as derived on the second device 602. The decrypted set of biometric access data can then be stored on secure memory 303 on device 602 to allow user 603 to get access to biometrically secure device 602 without having to pre-register on that device. Device 602 is thereby onboarded to the biometrically secure network without each user represented by the set of biometric access data having to provide their biometrics to second device 602. At the same time, neither the user's biometric data nor the key associated with that encryption of that biometric data was ever available in unencrypted form outside of the secure execution environments on the network.

As seen by the fact that both steps 702 and 706 require a sample of a biometric form the transfer agent, the transfer agent will need to be present at all the devices that are onboarded to the network to provide the biometric necessary to decrypt the set of biometric data. However, this approach still prevents all the users represented by that set of biometric access data from having to register their biometrics independently to each device in the network. In a network in which dozens or hundreds of users are registered to use each device, this approach can still provide a significant degree of efficiency over an approach in which each device is trained individually for each user.

FIG. 8 illustrates flow chart 800 for a set of methods for deriving a biometrically derived secret key on a first biometrically secured electronic device and a second biometrically secured electronic device. Flow chart 800 is similar to flow chart 700 in that steps on the left side of the diagram are performed by a first device, such as device 601, while steps on the right side of the diagram are performed by a second device, such as device 602. Flow chart 800 is also similar in that it includes a subset of steps that are in common with flow chart 700. These steps are accordingly labeled using reference numbers from flow chart 700. The same discussion applied to those steps above with reference to flow chart 700 applies to the similarly labeled steps in flow chart 800. Flow chart 800 differs in that it includes additional steps that facilitated the execution of a fuzzy extractor in generating the same secret biometrically derived key on two different devices even though each device may receive a slightly different sample of the same biometric.

Flow chart 800 includes a collection of steps 801 that involve generating a triplet of data associated with the biometric encryption scheme. The data triplet includes the secret biometrically derived key itself as generated in step 703 along with a helper string 803, and a biometric description 802. The helper string is generated in the secure execution environment along with the secret biometrically derived key and exhibits a level of correlation with the secret biometrically derived key. However, the helper string is intended to be electronically transmitted to another device and therefore must be exposed outside of the secure execution environment. The transmission of the helper string is illustrated by step 805, and can be preceded by encrypting the helper string such as via an asymmetric encryption scheme. The asymmetric encryption scheme may rely on certificates that were programmed into the devices in a secure room when they were manufactured.

The helper string generated in step 803 is used by the secure execution environment on the second device, such as device 602, to assure that the same secret biometrically derived key is derived from the second sample of the biometric in step 707 even if the first and second samples differ. For example, a person may provide a finger print on one day and then provide the same finger print after suffering a paper cut on their finger or having dirt or oil smeared on their finger. The degree to which the helper string correlates with the secret biometrically secure key sets a trade-off between two factors. As the correlation between the helper string and key increases, the security of the key decreases because it becomes more likely than an intruder will be able to uncover the secret biometrically secure key by analyzing the helper string. However, at the same time, the utility of the key increases because the key can be regenerated using less precise hardware and less stringent sampling requirements. The option of encrypting the helper string is provided herein because of the resulting potential for reconstruction of the secret biometrically derived key from a correlated helper string.

The generation of helper string 803 is shows as a separate and prior step to the generation of secret key 703. However, it should be noted that the steps can be performed in either order and can also be generated simultaneously using a single biometrically derived key derivation procedure such that step 703 includes the execution of step 803. Step 803 can be generated using a secure execution environment on a device. Step 803 can be executed by a fuzzy extractor on a device. In addition, the use of a helper string is optional, and it is possible, and generally more secure, to not utilize a helper string for subsequent derivations of a secret biometrically secure key. As such, step 803 can also be entirely removed from flow chart 800.

Flow chart 800 also includes a step 802 in which a description of a biometric is generated. The description can be programmed into the device in a permanent fashion such that step 802 simply involves retrieving the description from ROM memory. However, fuzzy extractor 605 may select biometrics from a library of options to increase the security of the secret biometrically derived key from being discovered via reverse engineering as another degree of variability is introduced to the system. The description can be a text string and associated data identifying the biometric such as "right index finger fingerprint." The description can also involve a multi-part biometric such as "voice print and right index finger." The description is transferred from the first biometrically secured device to the second biometrically secured device either via an intermittent server or a direct connection. In step 806, the description is used by the second biometrically secured device to generate a prompt for the biometric in order to guide the transfer agent in providing the correct biometric. As with the helper string, the description can also be encrypted before it is transmitted to the other device. The execution of these steps is illustrated in block diagram 600 as occurring outside the secure execution environment since the associated information is less sensitive, and because the generation of prompts on an electronic device are usually controlled by a general execution environment. However, the steps could also be executed within the secure execution environment. In particular, step 806 could be conducted by the secure execution environment in a device where a general processor on the device could temporarily cede control of a display to the secure execution environment.

Figure 9:
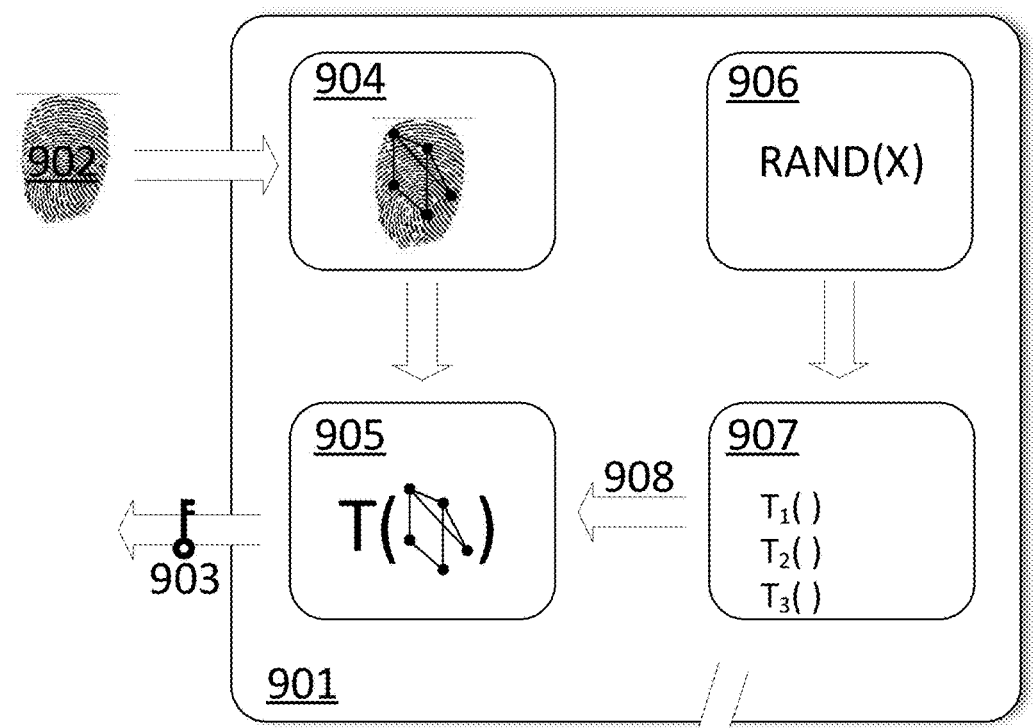
FIG. 9 illustrates a block diagram of a fuzzy extractor system for deriving a biometrically derived secret key in accordance with certain approaches disclosed herein.
Figure 9:
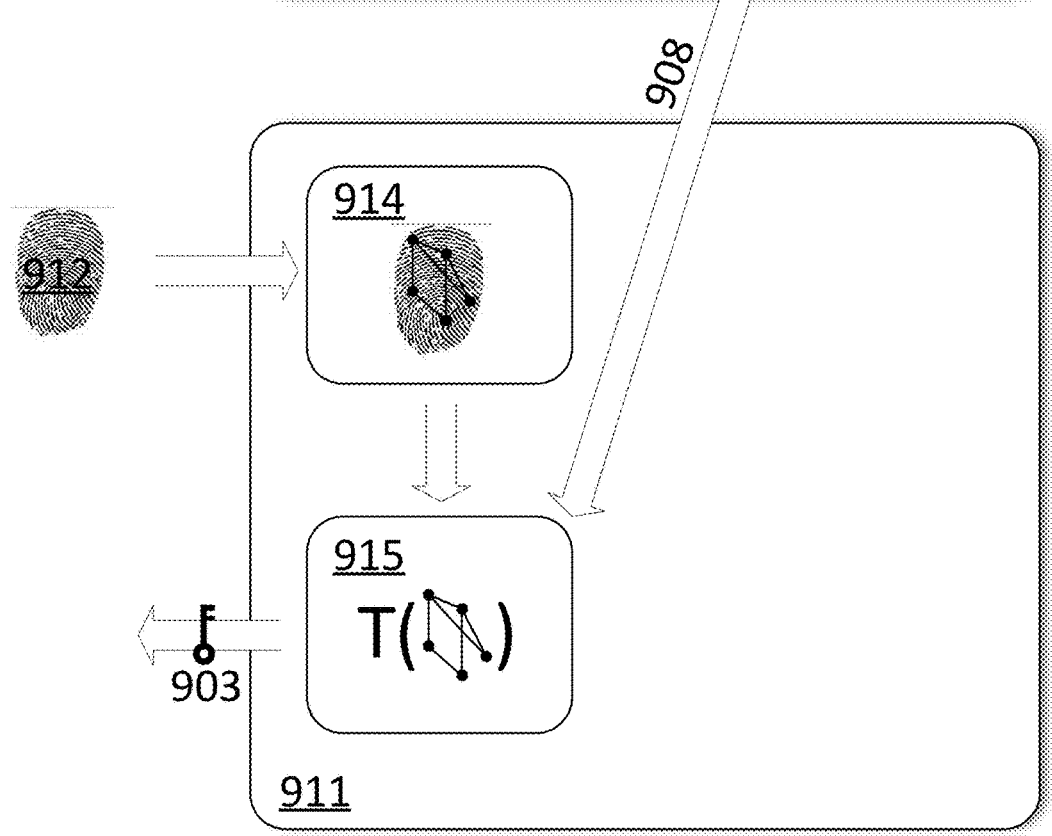

FIG. 9 illustrates block diagram 900 of a fuzzy extractor system for deriving a biometrically derived secret key in accordance with certain approaches disclosed herein. Block diagram 900 includes two fuzzy extractors 901 and 911 that can each exhibit the same features as fuzzy extractors 605 in FIG. 6. In particular, fuzzy extractor 901 could be instantiated on a first biometrically secure device 201, while fuzzy extractor 902 could be instantiated on a second biometrically secure device 202. Fuzzy extractor 901 could receive data representing a first sample of a biometric 902 for purposes of generating a secret biometrically derived key 903 therefrom. Fuzzy extractor 911 could receive data representing a second sample of that same biometric 912 for purposes of generating the same secret biometrically derived key 903 therefrom.

Fuzzy extractors 901 and 911 include feature extractors 904 and 914. The feature extractors could receive data representing a sample of the first biometric, extract features from the biometric data, and generate a feature vector. The feature vector could be an ordered list of specific biometric details that are present or absent in the given biometric input. For example, in the case of fingerprints, the feature vector may be a list of features such as the positions of ridges or loop bifurcations in the fingerprint. The selection of features chosen for the feature vector is important because the fuzziness of the system will increase with a greater number of feature involved. As mentioned, fuzziness is important because otherwise a subsequent sample of a finger print might not match the original sample sufficiently to allow the user to access the network. Fuzziness can be accomplished by, for example, using the relative position of features instead of the absolute position (e.g., Forked Ridge in the $5^{th}$-$8^{th}$ ring at a 120-160° offset).

The order of features generated by feature extractors 904 and 914 should match to assure that the same key is generated by each system. For example, if the biometric is a composite biometric, features associated with one biometric in the composite (e.g., a finger print) can be concatenated with features associated with a second biometric, but they need to be positioned in the same order with respect to the second biometric in the composite (e.g., a voice print). In the more basic case of the biometric being a single fingerprint the order of features extracted from that finger print should match on both devices. The order of features generated by the feature extractors could be programmed into the devices to assure they match. However, the order of the feature vectors could also vary throughout the life cycle of the network to add more variance to the encryption system and provide further defense against attacks. In situations where the order of features varied, the order could be transmitted from the first biometric device that was used to generate the secret biometrically derived key initially, to the second biometric device that is used to reproduce the secret biometrically derived key. The order of features could be transmitted along with the description of the biometric and could be transmitted in encrypted form. After extracting the features using the feature extractor, the fuzzy extractor could then either generate a biometrically derived key directly from the feature vector, or continue with the process illustrated by FIG. 9 in which the feature vector is applied to a transform engine 905.

In approaches in which a transform is applied to a feature vector, the first biometrically secured device could send a secure sketch to the second biometrically secured device. The secure sketch could describe the transform. The secure sketch could include a random data string to be applied to the feature vector via the transform. The secure sketch could serve as the helper string mentioned above. Random data could be added to the transform so that even if both the helper string and key were obtained, it would only provide one example of a link between the biometric and the key. As a result, if enough sets of helper strings and keys were obtained, there would still be no way to reconstruct the biometric using standard statistical decryption attacks. This feature would be particularly useful where a transfer agent used the same finger print to produce keys in a different ecosystem since the transform, through the addition of random data, would be completely unique to a single particular biometric network.

Block diagram 900 provides a specific implementation for generating a helper string to assist in the generation of the same key in two fuzzy extractors. Block diagram 900 includes random source generator 906, which is programmed to generate random data for the key generation process, a transform selector 907, which is programmed to specify a transform to apply to the feature vector, and a transform engine programmed to apply a transform to the feature vector. Transform selector 907 can generate a transform based on the random source data generated by random source generator 906. The random source data can be used to select a type of transform that fuzzy extractors 901 and 911 are programmed to execute. The random source data can also be integrated into the transform itself as will be described below. A description of the transform, in the form of a helper string or secure sketch, can then be utilized by transform engine 905 and can also be sent to a second biometric device to be utilized by transform engine 915 in fuzzy extractor 911. As a result, both fuzzy extractor 911 and 901 will generate the same secret biometrically derived key even if samples 902 and 912 are not precise matches. Although key 903 is drawn exiting directly from transform engines 905 and 915, the actual output of the transform engines could be applied to an additional hashing function before the final key was available for decrypting or encrypting the biometric access data on the devices.

Figure 10:
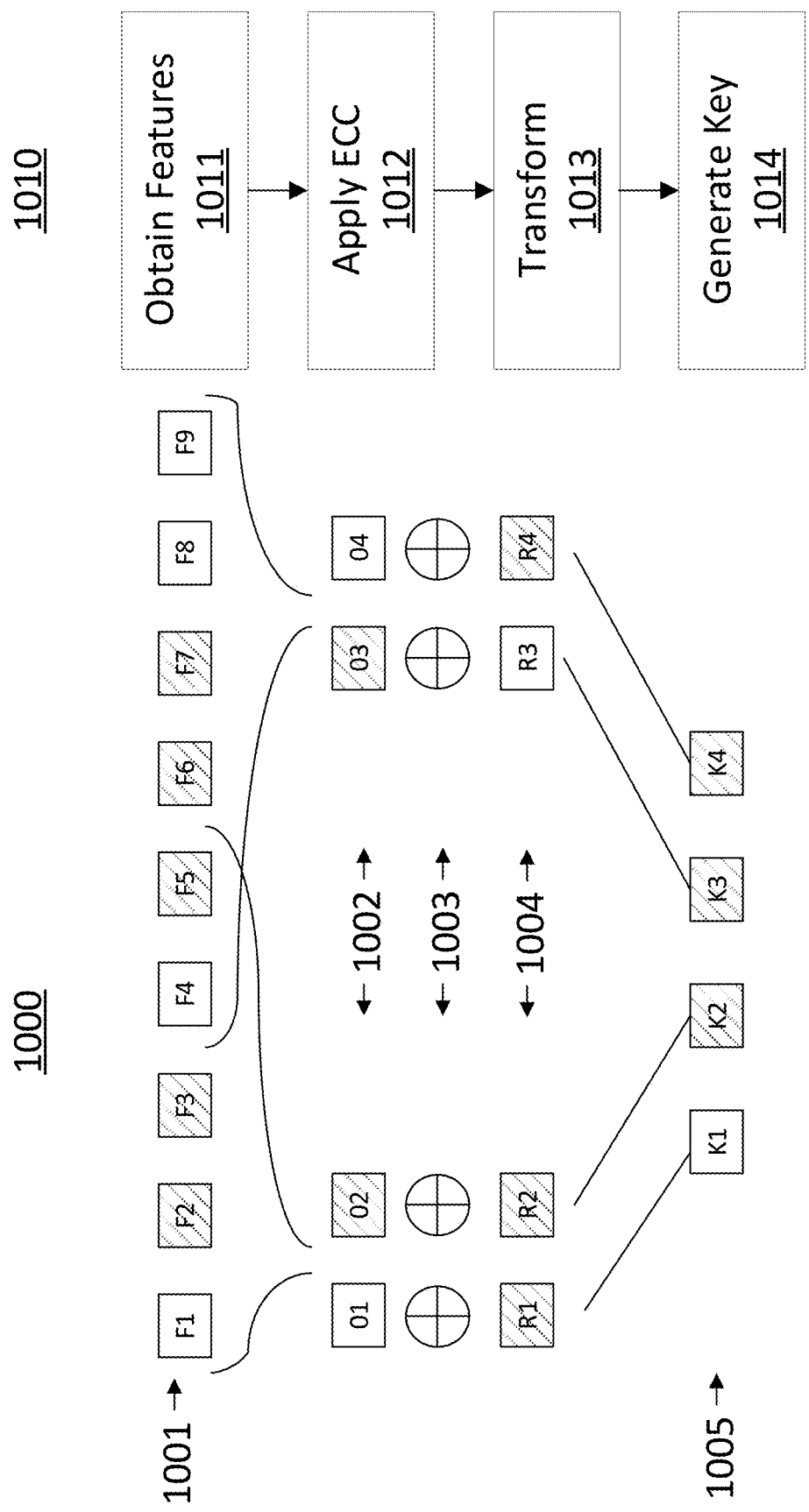
FIG. 10 illustrates a flow chart and operational flow diagram for deriving a biometrically derived secret key in accordance with certain approaches disclosed herein.

FIG. 10 illustrates a flow chart 1010 and operational flow diagram 1000 for deriving a biometrically derived secret key in accordance with a transform and as executed by a transform engine. Flow chart 1010 begins with a step 1011 of obtaining a set of features from the first sample of the first biometric. This step can be executed by a feature extractor such as feature extractor 904 which obtains a set of features from sample 902 for delivery to transform engine 905. Feature vector 1001 is a simplified example of a feature vector for purposes of explanation in which 9 features F1-F9 can exhibit one of two values illustrated by being either blank or hashed. The elements of the feature vector can be referred to as a set of features.

Flow chart 1010 continues with a step 1012 of applying a set of error correction code to the set of features to generate a set of outputs. Step 1012 can be executed by a transform engine such as transform engine 905. The error correction codes can operate on overlapping features in the feature vector. The error correction codes will act to minimize the effect of variations in the biometric samples. In effect, variations in the biometric samples from an ideal value are treated like errors in a string of data that are corrected for using an error correction system. The application of the error correction codes to the feature vector is a set of outputs 1002.

Flow chart 1010 continues with a step 1013 of transforming the output of step 1012 using random data and a transform. Step 1013 can also be executed by a transform engine such as transform engine 905. The random data can be generated by a random source such as random source 906. In the illustrated example, the random source is actually integrated into the transform. As illustrated, transform 1003 is an exclusive or (XOR) transform, and the random source includes a random data string 1004 of values that can be XOR'd with outputs 1002. Flow chart 1010 finishes with a step 1014 of generating a symmetric biometrically derived key. In data flow diagram 1000 the key is symmetric biometrically derived key 1005. Data flow diagram 1000 is an overly simplified example for purposes of explanation only. In an actual implementation, the number of data elements would greatly exceed four, and/or the number of potential states for the elements would greatly exceed two. Furthermore, the output of the transform would likely be applied to a hash function before the key was actually utilized for encryption of decryption.

FIG. 10 illustrates how a secret biometrically derived key can be generated from a feature vector even with fuzziness introduced in the individual features of the feature vector. The error correction codes assist with a consistent key generation even if some of the features are not properly detected. Error correction codes used in combination with these approaches will beneficially exhibit a large number of inputs for a small number of outputs. Allowing the error correction codes to overlap allows portions of the feature vector to be reused for this purpose so the resulting output data is not unacceptably short and unable to provide a high enough degree of security when it is time to encrypt the biometric access data. The error correction codes applied in each fuzzy extractor can either be fixed when the devices are manufactured to assure alignment or they can be shared between devices along with implementations above in which the biometric description, random data, transform selection, and/or secure sketch are shared between devices. Like those approaches, the error correction codes can be encrypted using asymmetric RSA encryption before they are transmitted from one device to the next.

Figure 11:
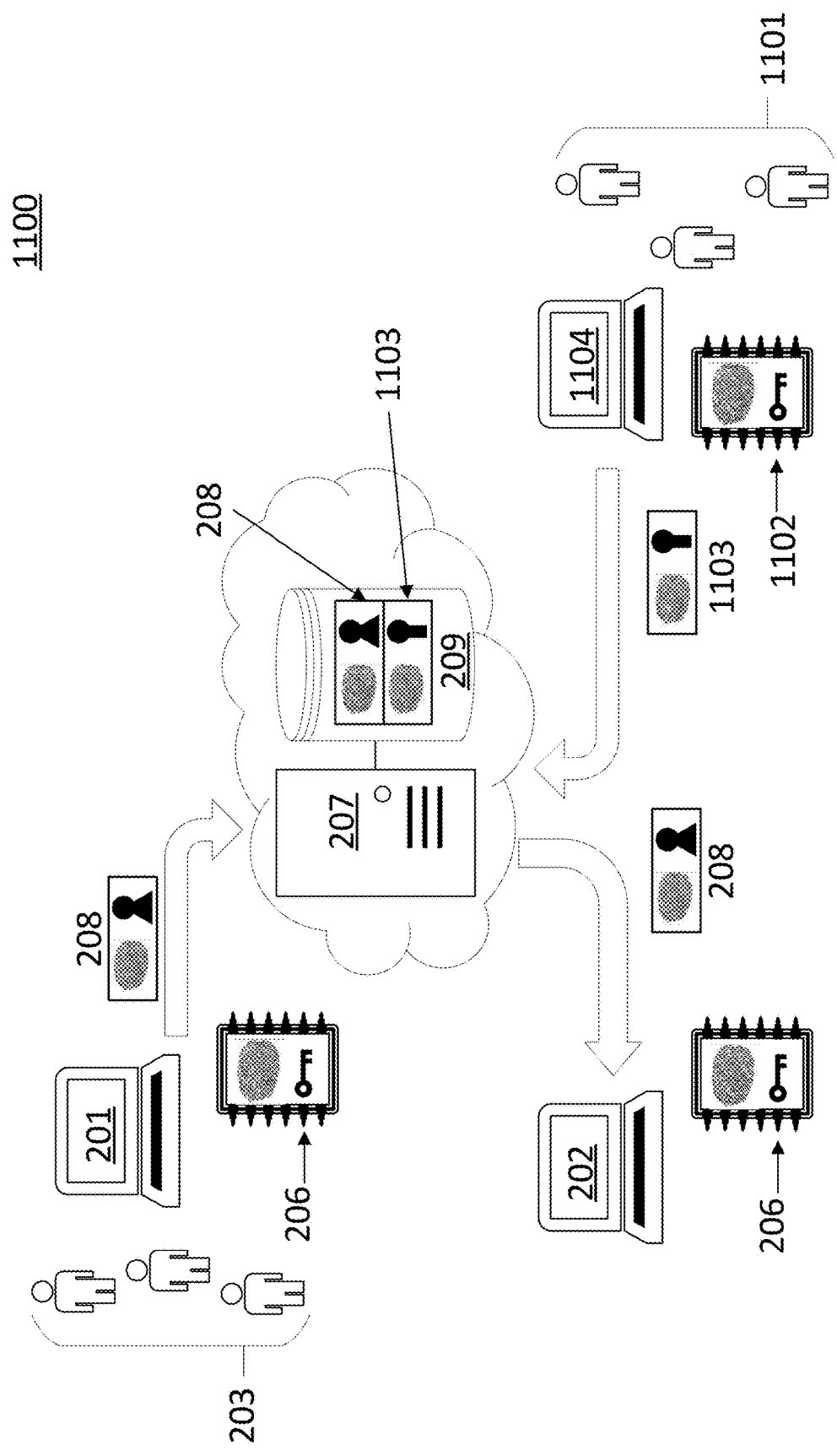
FIG. 11 illustrates a block diagram of two networks of biometrically secured devices in accordance with certain approaches disclosed herein.

In the approaches described above, the biometric access data is encrypted within the secure execution environments of the network so that it can be transmitted to additional devices on the network to keep them updated with newly received biometric access data, or to initially onboard those additional devices to the network. However, the biometric access data, once encrypted, can also be transmitted out of the secure execution environment for storage on a server or other location outside of the secure execution environments on the network. From a system perspective, one benefit of storing the biometric information at a central server in an encrypted format is that the same server can administrate the storage and delivery of biometric information for multiple sets of networks. With reference to system 1100 in FIG. 11, server 207 can administrate a network for set of users 203 and set of users 1101. The sets of users 203 and 1101 may be employees or members of different network owners while server 207 is operated by a single network operator. For example, server 207 could be operated by the purveyor of a POS system while user sets 203 and 1101 could be sets of employees associated with different merchants that utilize that POS system. Since the sets of biometric information are encrypted using separate master encryption keys 206 and 1102, the same server can store encrypted biometric information 1103 obtained via device 1104 and encrypted biometric data 208 obtained from device 201. The methods described with reference to FIGS. 4-6 could then be repeated for another device that user set 1101 would thereby be registered to access.

Sets of encrypted biometric data stored in database 209 could be stored in association with different merchant identifiers. The merchant identifiers could uniquely identify owners of the various individual devices on any given network. In addition to storing the data with a merchant identifier, a unique key pair could be set up during the initial registration of a network with the central server to ensure that only those devices which belong to a given network are able to access the stored biometric information—even in encrypted form. This process is also beneficial if the network transmits information through public networks such as the Internet to assure that communications on the network are kept secure.

Figure 12:
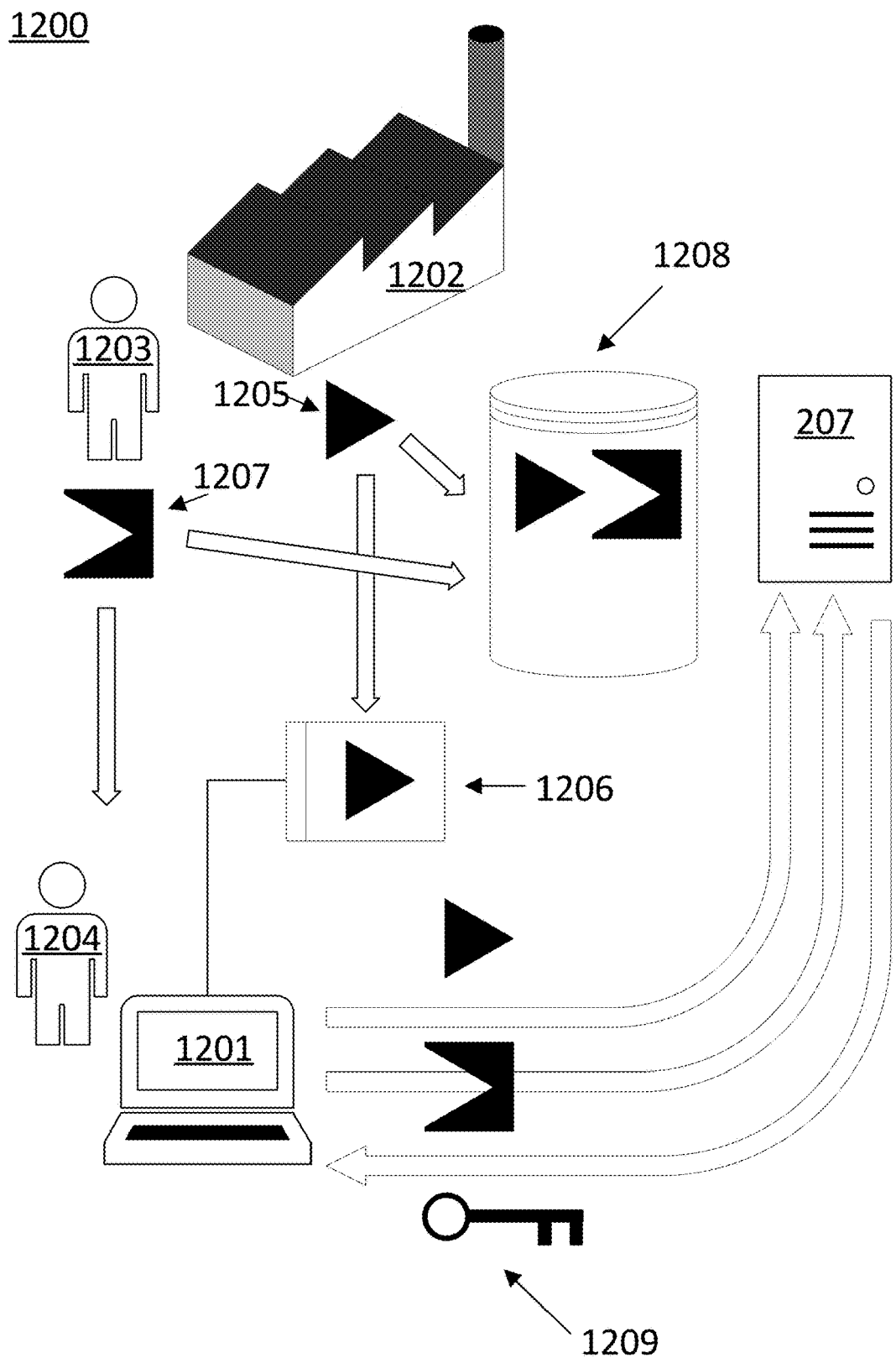
FIG. 12 illustrates a block diagram of a system for conducting an initial enrollment procedure in accordance with certain approaches disclosed herein.
Figure 13:
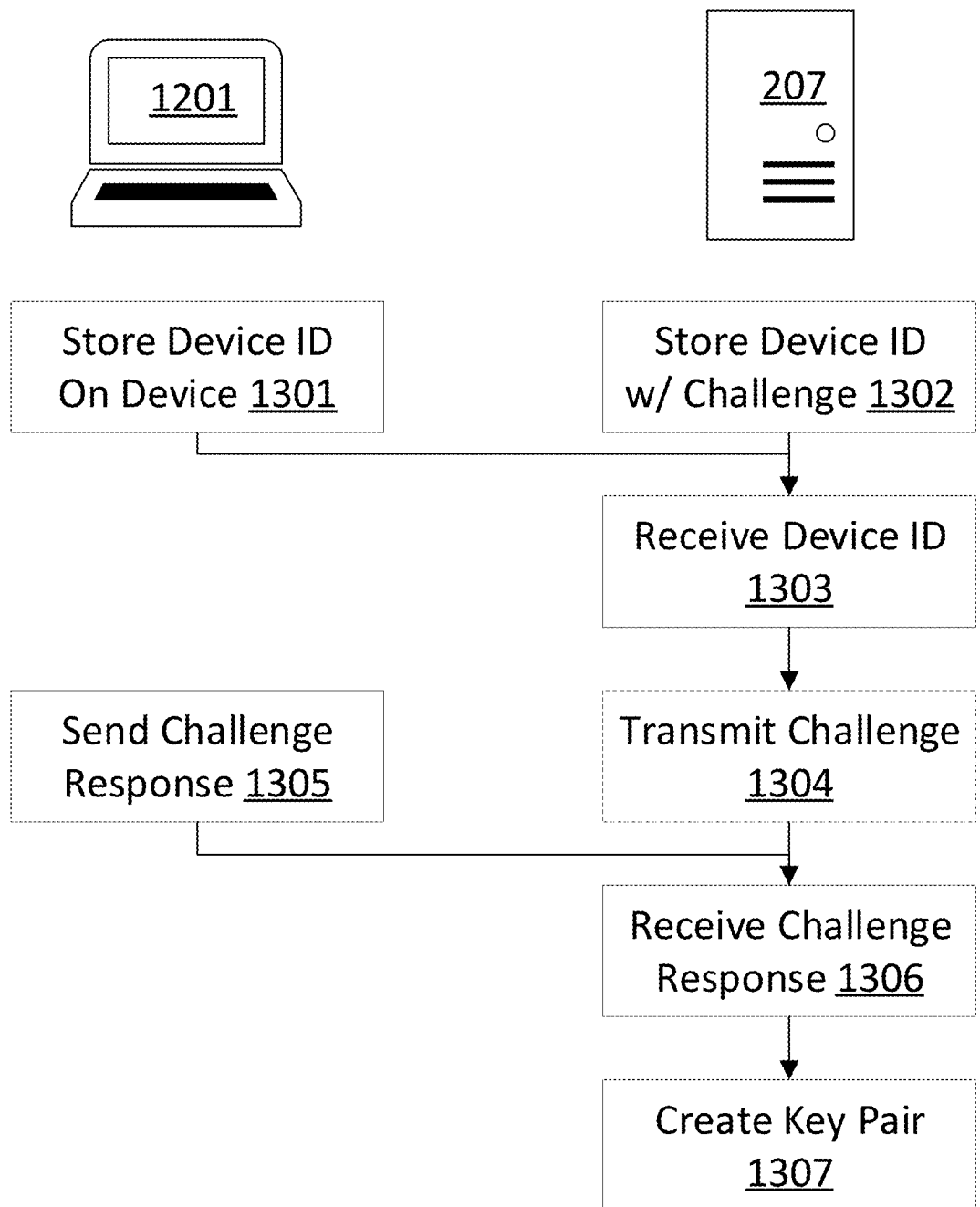
FIG. 13 illustrates a block diagram of a flow chart for conducting an initial enrollment procedure in accordance with certain approaches disclosed herein.

An initial enrollment procedure for any given device and network can be described with reference to the block diagram of system 1200 in FIG. 12 and the methods illustrated by flow chart 1300 in FIG. 13. Device 1201 and server 207 in block diagram 1200 can each store instructions to execute the steps associated with those nodes using a processor and a memory. Device 1201 is manufactured at factory 1202 and sold by network administrator 1203 to purchaser 1204. Device 1201 could be any of the devices mentioned above with respect to device 201. In particular, device 1201 could be a POS terminal and purchaser 1204 could be a merchant interested in operating that POS terminal at their place of business. In the methods illustrated by flow chart 1300, information is distributed between purchaser 1204, device 1201 itself, and server 207 in order to assure that the device is properly enrolled on the network in a secure fashion.

In step 1301, a device identifier 1205 is stored on device 1201 as it is produced at factory 1202. The device identifier can be stored on nonvolatile memory 1206 of device 1201. In certain approaches, the device identifier will not be readily determinable from the exterior of the device, and might not be accessible to any direct interface with device 1201 without accessing the information via server 207. For example, nonvolatile memory 1206 may only be accessible to a secure execution environment 302 on device 1201 in combination with server 207. The identifier may be an injected code burned into the device as it is moving through a manufacturing line.

In step 1302, device identifier 1205 is stored along with an owner challenge response 1207 in a database 1208. The information in database 1208 will be accessible to server 207. Device identifier 1205 can be provided to database 1208 separately from owner challenge response 1207. As such, factory 1202 will not necessarily have access to both the device identifier and the owner challenge response. Owner challenge response 1207 can be provided to purchaser 1204 via any private communication channel between network administrator 1203 and purchaser 1204. Although block diagram 1200 is shown with the owner challenge response originating with network administrator 1203, the owner could initially select the owner challenge response. Owner challenge response 1207 could be as simple as a text string representing a corporate name of purchaser 1204, could be a password, or could be data embedded on a specialized fob used to initialize device 1201.

In step 1303, device identifier 1205 is received at server 207 from device 1201. The device identifier 1205 can be transmitted by the device 1201 to server 207 as soon as the device is put into operation and connected to a network. Upon receiving device identifier 1205, server 207 can conduct step 1304 and transmit an owner challenge to device 1201. The transmission of an owner challenge from server 207 to device 1201 in step 1304 is optional so it is illustrated using dotted lines in FIG. 13. The transmitted challenge could be a customized challenge specifically intended for a particular purchaser and could be stored in association with the device identifier at server 207. However, the challenge could also be a generic challenge such as a password request or other call for information. Step 1304 is optional because device 1201 could include a prompt for the owner challenge information as part of its initial setup routine. For example, device 1201 could automatically prompt a user for a password as soon as it has completed transmitting the device identifier to the server.

In step 1306, the owner challenge response is received from device 1201 at server 207. The challenge response can be transmitted from device 1201 in step 1305. Upon receiving the owner challenge response, server 207 will compare the response with the value initially provided to database 1208. If the owner challenge response matches the stored value, server 207 will conduct step 1307 in which a key pair is generated for communication between server 207 and device 1201. The key pair can be generated using RSA or other similar encryption algorithm. The generated key 1209 can be transmitted to device 1201. After server 207 and device 1201 establish a secure communication channel, device 1201 can internally generate a master encryption key and begin receiving user biometric information to be stored on the device, encrypted, and potentially transmitted up to server 207 for storage in the cloud. Subsequently, as additional devices are brought online by purchaser 1204, server 207 will be able to use the same procedure to authorize those additional devices to operate on the same network as device 1201 which will provide the additional devices with access to the encrypted biometric data and master encryption key stored on device 1201 in accordance with the methods described above with reference to FIGS. 4-11.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The devices disclosed herein can be programmed to execute any of the method steps discussed above. The biometric information can be a mix of more than one type of biometrically sampled data such as a combination of both voice and facial recognition, and multiple devices on the network can be configured to sample or read a subset of those data types. These and other modifications and variations to the present invention may be practiced by those skilled in the art, without departing from the scope of the present invention, which is more particularly set forth in the appended claims.

What is claimed is:

1. A method comprising:
   obtaining, using a first sensor on a first biometrically secured device, a first sample of a first transfer agent biometric;
   generating, using a first secure execution environment on the first biometrically secured device, a secret biometrically derived key using the first sample of the first transfer agent biometric;
   encrypting, using the first secure execution environment and the secret biometrically derived key, a set of biometric data to produce a set of encrypted biometric data, wherein the set of biometric data comprises data from at least two users that are registered to use the first biometrically secured device;
   transmitting the set of encrypted biometric data from the first biometrically secured device to a second biometrically secured device;
   obtaining, using a second sensor on the second biometrically secured device, a second sample of the first transfer agent biometric;
   generating, using a second secure execution environment on the second biometrically secured device, the secret biometrically derived key using the second sample of the first transfer agent biometric;
   decrypting, using the second secure execution environment and the secret biometrically derived key, the set of encrypted biometric data; and
   verifying, after decrypting the set of encrypted biometric data on the second biometrically secured device, at least one of the at least two users on the second biometrically secured device using the set of biometric data.

2. The method from claim 1, further comprising:
   obtaining, using the first sensor on the first biometrically secured device, the set of biometric data; and
   instantiating an operating system for the first biometrically secured device using a first processor;
   wherein the set of biometric data is transferred directly from the first sensor to the first secure execution environment without ever being accessible to the first processor.

3. The method from claim 1, further comprising:
   obtaining, using the first sensor on the first biometrically secured device, a first sample of a second biometric;
   wherein the generating of the secret biometrically derived key uses the first sample of the first transfer agent biometric and the first sample of the second biometric; and
   wherein the first transfer agent biometric and the second biometric uniquely identify two users.

4. The method from claim 1, further comprising:
   writing the set of encrypted biometric data to a memory on the first biometrically secured device using the first secure execution environment;
   receiving, at the first biometrically secured device, a biometric login request;
   comparing, using the first secure execution environment, data from the biometric login request with data from the set of encrypted biometric data; and
   authorizing access to the first biometrically secured device based on the comparison step;
   wherein the first biometrically secured device includes a standard execution environment for instantiating an operating system on the first biometrically secured device; and
   wherein the memory is only addressable by the first secure execution environment and is not addressable by the standard execution environment.

5. The method from claim 1, wherein:
   the generating of the secret biometrically derived key is conducted using a fuzzy extractor; and
   the generating of the secret biometrically derived key includes generating a helper string.

6. The method from claim 5, further comprising:
   generating a description of the first transfer agent biometric;
   transferring the description and the helper string from the first biometrically secured device to the second biometrically secured device with the set of encrypted biometric data;
   generating a prompt for the first transfer agent biometric on the second biometrically secured device using the description;
   wherein the generating of the secret biometrically derived key using the second secure execution environment on the second biometrically secured device uses the helper string.

7. The method from claim 5, wherein generating the secret biometrically derived key further comprises:
   generating a description of the first transfer agent biometric;
   generating a prompt for the first transfer agent biometric on the second biometrically secured device using the description;
   obtaining a set of features from the first sample of the first transfer agent biometric;
   applying a set of error correction codes to the set of features to generate a set of outputs; and
   transforming, using random data and a transform, the set of outputs;
   wherein the helper string is a secure sketch; and
   wherein the secure sketch includes the description, the random data, and the transform.

8. The method from claim 5, further comprising:
   receiving, at a server, the set of encrypted biometric data, and the helper string from the first biometrically secured device; and
   transmitting, from the server, the set of encrypted biometric data, and the helper string to the second biometrically secured device.

9. The method from claim 8, further comprising:
  storing, in a database and using the server, the set of encrypted biometric data after receiving the set of encrypted biometric data from the first biometrically secured device;
  obtaining, using the first sensor on the first biometrically secured device, a new biometric;
  encrypting, using the first secure execution environment and the secret biometrically derived key, the new biometric to form a new encrypted biometric,
  transmitting, from the first biometrically secured device, the new encrypted biometric to the server; and
  storing, in the database and using the server, the new encrypted biometric with the set of encrypted biometric data.

10. The method from claim 9, further comprising:
  pushing, using the server, the new encrypted biometric to the second biometrically secured device.

11. The method from claim 9, wherein:
  the first and second sensors are finger print sensors;
  the set of encrypted biometric data is stored in the database in association with a merchant identifier; and
  the merchant identifier uniquely identifies an owner of the first and second biometrically secured devices.

12. The method from claim 1, further comprising:
  receiving a password at the first biometrically secured device;
  receiving the password at the second biometrically secured device;
  establishing a secure connection directly between the first biometrically secured device and the second biometrically secured device after verifying the password as received by the first biometrically secured device matches the password as received by the second biometrically secured device; and
  transmitting, using the secure connection, the set of encrypted biometric data from the first biometrically secured device to the second biometrically secured device.

13. A non-transitory computer-readable medium storing instructions that are executable by a processor to perform a method comprising:
  obtaining, using a first sensor on a first biometrically secured device, a first sample of a first transfer agent biometric;
  generating, using a first secure execution environment on the first biometrically secured device, a secret biometrically derived key using the first sample of the first transfer agent biometric;
  encrypting, using the first secure execution environment and the secret biometrically derived key, a set of biometric data to produce a set of encrypted biometric data, wherein the set of biometric data comprises data from at least two users that are registered to use the first biometrically secured device;
  transmitting the set of encrypted biometric data from the first biometrically secured device to a second biometrically secured device;
  obtaining, using a second sensor on the second biometrically secured device, a second sample of the first transfer agent biometric;
  generating, using a second secure execution environment on the second biometrically secured device, the secret biometrically derived key using the second sample of the first transfer agent biometric;
  decrypting, using the second secure execution environment and the secret biometrically derived key, the set of encrypted biometric data; and
  verifying, after decrypting the set of encrypted biometric data on the second biometrically secured device, at least one of the at least two users on the second biometrically secured device using the set of biometric data.

14. The non-transitory computer-readable medium from claim 13, wherein the method further comprises:
  obtaining, using the first sensor on the first biometrically secured device, the set of biometric data; and
  instantiating an operating system for the first biometrically secured device using a first processor;
  wherein the set of biometric data is transferred directly from the first sensor to the first secure execution environment without ever being accessible to the first processor.

15. The non-transitory computer-readable medium from claim 13, wherein the method further comprises:
  obtaining, using the first sensor on the first biometrically secured device, a first sample of a second biometric;
  wherein the generating of the secret biometrically derived key uses the first sample of the first transfer agent biometric and the first sample of the second biometric; and
  wherein the first transfer agent biometric and the second biometric uniquely identify two users.

16. The non-transitory computer-readable medium from claim 13, wherein the method further comprises:
  writing the set of encrypted biometric data to a memory on the first biometrically secured device using the first secure execution environment;
  receiving, at the first biometrically secured device, a biometric login request;
  comparing, using the first secure execution environment, data from the biometric login request with data from the set of encrypted biometric data; and
  authorizing access to the first biometrically secured device based on the comparison step;
  wherein the first biometrically secured device includes a standard execution environment for instantiating an operating system on the first biometrically secured device; and
  wherein the memory is only addressable by the first secure execution environment and is not addressable by the standard execution environment.

17. The non-transitory computer-readable medium from claim 13, wherein:
  the generating of the secret biometrically derived key is conducted using a fuzzy extractor; and
  the generating of the secret biometrically derived key includes generating a helper string.

18. The non-transitory computer-readable medium from claim 17, wherein the method further comprises:
  generating a description of the first transfer agent biometric;
  transferring the description and the helper string from the first biometrically secured device to the second biometrically secured device with the set of encrypted biometric data;
  generating a prompt for the first transfer agent biometric on the second biometrically secured device using the description;

wherein the generating of the secret biometrically derived key using the second secure execution environment on the second biometrically secured device uses the helper string.

19. The non-transitory computer-readable medium from claim 17, wherein generating the secret biometrically derived key further comprises:
   generating a description of the first transfer agent biometric;
   generating a prompt for the first transfer agent biometric on the second biometrically secured device using the description;
   obtaining a set of features from the first sample of the first transfer agent biometric;
   applying a set of error correction codes to the set of features to generate a set of outputs; and
   transforming, using random data and a transform, the set of outputs;
   wherein the helper string is a secure sketch; and
   wherein the secure sketch includes the description, the random data, and the transform.

20. The non-transitory computer-readable medium from claim 17, wherein the method further comprises:
   receiving, at a server, the set of encrypted biometric data, and the helper string, from the first biometrically secured device; and
   transmitting, from the server, the set of encrypted biometric data, and the helper string to the second biometrically secured device.

21. The non-transitory computer-readable medium from claim 20, wherein the method further comprises:
   storing, in a database and using the server, the set of encrypted biometric data after receiving the set of encrypted biometric data from the first biometrically secured device;
   obtaining, using the first sensor on the first biometrically secured device, a new biometric;
   encrypting, using the first secure execution environment and the secret biometrically derived key, the new biometric to form a new encrypted biometric,
   transmitting, from the first biometrically secured device, the new encrypted biometric to the server; and
   storing, in the database and using the server, the new encrypted biometric with the set of encrypted biometric data.

22. The non-transitory computer-readable medium from claim 21, wherein the method further comprises:
   pushing, using the server, the new encrypted biometric to the second biometrically secured device.

23. The non-transitory computer-readable medium from claim 21, wherein:
   the first and second sensors are finger print sensors;
   the set of encrypted biometric data is stored in the database in association with a merchant identifier; and
   the merchant identifier uniquely identifies an owner of the first and second biometrically secured devices.

24. The non-transitory computer-readable medium from claim 13, wherein the method further comprises:
   receiving a password at the first biometrically secured device;
   receiving the password at the second biometrically secured device;
   establishing a secure connection directly between the first biometrically secured device using the password as received by the first biometrically secured device and the second biometrically secured device; and
   transmitting, using the secure connection, the set of encrypted biometric data from the first biometrically secured device to the second biometrically secured device.

25. A system comprising:
   a first biometrically secured device having a first sensor and a first secure execution environment;
   a first memory system in the first biometrically secured device storing instructions to:
   (i) obtain a first sample of a first transfer agent biometric using the first sensor;
   (ii) generate, using the first secure execution environment, a secret biometrically derived key using the first sample of the first transfer agent biometric;
   (iii) encrypt, using the first secure execution environment, a set of biometric data using the secret biometrically derived key to produce a set of encrypted biometric data, wherein the set of biometric data comprises data from at least two users that are registered to use the first biometrically secured device; and
   (iv) transmit the set of encrypted biometric data from the first biometrically secured device to a second biometrically secured device and a third biometrically secured device;
   the second biometrically secured device, wherein the second biometrically secured device has a second sensor and a second secure execution environment;
   a second memory system in the second biometrically secured device storing instructions to:
   (i) receive the set of encrypted biometric data from the first biometrically secured device;
   (ii) obtain a second sample of the first transfer agent biometric using the second sensor;
   (iii) generate, using the second secure execution environment, the secret biometrically derived key using the second sample of the first transfer agent biometric;
   (iv) decrypt, using the second secure execution environment, the set of biometric data using the secret biometrically derived key; and
   (v) verify, after decrypting the set of encrypted biometric data on the second biometrically secured device, at least one of the at least two users on the second biometrically secured device using the set of biometric data; and
   the third biometrically secured device, wherein the third biometrically secured device has a third sensor and a third secure execution environment; and
   a third memory system in the third biometrically secured device storing instructions to:
   (i) receive the set of encrypted biometric data from the first biometrically secured device;
   (ii) obtain a third sample of the first transfer agent biometric using the third sensor;
   (iii) generate, using the third secure execution environment, the secret biometrically derived key using the third sample of the first transfer agent biometric; and
   (iv) decrypt, using the third secure execution environment, the set of biometric data using the secret biometrically derived key.

26. The system from claim 25, further comprising:
   a first fuzzy extractor instantiated using the first secure execution environment; and
   a second fuzzy extractor instantiated using the second secure execution environment;
   wherein the instructions on the first biometrically secured device that generate the secret biometrically derived key use the first fuzzy extractor and include instructions to generate a helper string; and wherein the instructions on the second biometrically secured device that generate the secret biometrically derived key use the second fuzzy extractor.

27. The system from claim 26, wherein:

the first memory system in the first biometrically secured device stores instructions to:

(i) generate a description of the first transfer agent biometric; and (ii) transmit the description and the helper string from the first biometrically secured device to the second biometrically secured device with the set of encrypted biometric data; and the second memory system in the second biometrically secured device stores instructions to:

(i) generate a prompt for the first transfer agent biometric using the description;

wherein the instructions on the second biometrically secured device that generate the secret biometrically derived key use the helper string to generate the secret biometrically derived key.

28. The system from claim 27, further comprising:

a feature extractor instantiated using the first secure execution environment programmed to obtain a set of features from the first sample of the first transfer agent biometric;

a random source generator instantiated using the first secure execution environment programmed to generate random data;

a transform selector programmed to specify a transform;

a transform engine programmed to: (i) apply a set of error correction codes to the set of features to generate a set of outputs; and (ii) transform the set of outputs using the transform and the random data to produce a transformed feature vector;

a hash module instantiated using the first secure execution environment programmed to hash the transformed feature vector to produce the secret biometrically derived key;

wherein the helper string is a secure sketch; and wherein the secure sketch includes the description, the random data, and the transform.

29. The system from claim 28, further comprising:

a server programmed to: receive the set of encrypted biometric data, the secure sketch, and the description from the first biometrically secured device; and transmit the set of encrypted biometric data, the helper string, and the description to the second biometrically secured device; and a database that stores the set of encrypted biometric data in association with a merchant identifier;

wherein the merchant identifier uniquely identifies an owner of the first and second biometrically secured devices.

30. The system from claim 27, wherein:

the first memory system in the first biometrically secured device stores instructions to:

(i) receiving a password from a first user input; and the second memory system in the second biometrically secured device storing instructions to:

(i) receive the password from a second user input;

(ii) receive the password from the first biometrically secured device; and (iii) establish a secure connection with the first biometrically secured device based on the password received from the second user input matching the password received from the first biometrically secured device; and (iv) transmit the set of encrypted biometric data from the first biometrically secured device to the second biometrically secured device using the secure connection.

* * * * *

UNITED STATES PATENT AND TRADEMARK OFFICE
CERTIFICATE OF CORRECTION

PATENT NO. : 10,621,584 B2
APPLICATION NO. : 15/828962
DATED : April 14, 2020
INVENTOR(S) : Sameer Jayant Thatte et al.

Page 1 of 1

It is certified that error appears in the above-identified patent and that said Letters Patent is hereby corrected as shown below:

In the Specification

Column 11, Line 40, please delete "device 2041" and insert --device 201--.

In the Claims

Claim 12, Column 23, Line 38, before "transmitting", please insert --wherein the--.
Claim 12, Column 23, Line 38, after "transmitting", please delete ", using the secure connection," and insert --of--.
Claim 12, Column 23, Line 41, after "device", please insert --uses the secure connection--.

Claim 24, Column 26, Line 1, before "transmitting", please insert --wherein the--.
Claim 24, Column 26, Line 1, after "transmitting", please delete ", using the secure connection," and insert --of--.
Claim 24, Column 26, Line 4, after "device", please insert --uses the secure connection--.

Claim 30, Column 28, Line 34 to Line 36, please delete "(iv) transmit the set of encrypted biometric data from the first biometric secured device to the second biometrically secured device using the secure connection." and insert --the transmitting of the set of encrypted biometric data from the first biometrically secured device to the second biometrically secured device uses the secure connection.--.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*